US009128939B2

(12) United States Patent  (10) Patent No.: US 9,128,939 B2
Kinsella  (45) Date of Patent: Sep. 8, 2015

(54) AUTOMATIC FILE NAMING ON A MOBILE DEVICE

(75) Inventor: Alexander Scott Kinsella, Kitchener (CA)

(73) Assignee: BlackBerry Limited, Waterloo, Ontario (CA)

( * ) Notice: Subject to any disclaimer, the term of this patent is extended or adjusted under 35 U.S.C. 154(b) by 455 days.

(21) Appl. No.: 12/947,201

(22) Filed: Nov. 16, 2010

(65) Prior Publication Data

US 2012/0124079 A1  May 17, 2012

(51) Int. Cl.
*G06F 17/30* (2006.01)

(52) U.S. Cl.
CPC .... *G06F 17/30041* (2013.01); *G06F 17/30044* (2013.01); *G06F 17/30061* (2013.01); *G06F 17/30064* (2013.01)

(58) Field of Classification Search
CPC .................. G06F 17/30867; G06F 17/30044; G06F 17/30061
USPC .......................................................... 707/769
See application file for complete search history.

(56) References Cited

U.S. PATENT DOCUMENTS

| | | | |
|---|---|---|---|
| 6,657,661 B1 | 12/2003 | Cazier | |
| 6,690,883 B2 | 2/2004 | Pelletier | |
| 7,009,643 B2 | 3/2006 | Nakamura et al. | |
| 7,248,285 B2 | 7/2007 | Needham | |
| 7,707,239 B2 | 4/2010 | Anderson et al. | |
| 2004/0148453 A1* | 7/2004 | Watanabe et al. ................. | 711/1 |
| 2007/0027911 A1* | 2/2007 | Hakala et al. ............... | 707/104.1 |
| 2007/0051793 A1 | 3/2007 | Katoh et al. | |
| 2008/0133697 A1 | 6/2008 | Stewart et al. | |
| 2008/0297409 A1 | 12/2008 | Klassen et al. | |
| 2009/0089322 A1* | 4/2009 | Naaman ..................... | 707/103 R |
| 2009/0280859 A1 | 11/2009 | Bergh | |
| 2010/0029326 A1* | 2/2010 | Bergstrom et al. ......... | 455/556.1 |

(Continued)

FOREIGN PATENT DOCUMENTS

| | | |
|---|---|---|
| CA | 2653838 A1 | 8/2009 |
| EP | 1879373 A1 | 1/2008 |

(Continued)

OTHER PUBLICATIONS

Extended European Search report dated Mar. 2, 2011 in corresponding application No. 10191445.5.

(Continued)

*Primary Examiner* — Etienne Leroux
*Assistant Examiner* — Cindy Nguyen
(74) *Attorney, Agent, or Firm* — Fish & Richardson P.C.

(57) ABSTRACT

A system and method of automatically naming files on a mobile device can include determining at least one of a current geographical location data of a mobile device, a current time data, and a current date data. The current geographical location data, the current time data, and the current date data can be made can be compared to at least one of a personal information manager database and a geographical location database. A filename can be automatically-generated based on the comparison, and the filename can be applied to camera data received on the mobile device. The automatically-generated filename can include information relevant to the content of the camera data, thereby enhancing the efficiency and ease of identifying and organizing camera data stored on a memory of the mobile device.

14 Claims, 15 Drawing Sheets

(56) References Cited

U.S. PATENT DOCUMENTS

| | | | |
|---|---|---|---|
| 2010/0091136 A1* | 4/2010 | Nakase et al. | 348/231.2 |
| 2010/0283867 A1* | 11/2010 | Choi | 348/231.3 |
| 2011/0035284 A1* | 2/2011 | Moshfeghi | 705/14.58 |

FOREIGN PATENT DOCUMENTS

| | | |
|---|---|---|
| EP | 2096857 | 9/2009 |
| WO | 0051342 A1 | 8/2000 |
| WO | 2006028383 a1 | 3/2006 |

OTHER PUBLICATIONS

Brandon, John—Microsoft Pro Photo tools2. http://www.shutterbug.com/content/microsoft%E2%80%99s-pro-photo-tools-2-post-exposure-gps-program. retrieved May 1, 2009.

An early Flicker uploader called "Meaning"; http://antimega.textdriven.com/antimega/2006/03/29/flicker.off. retrieved Mar. 29, 2006.

Add a geo field to iPhone and Address Book; http://bioneural.dyndns.org/2009/02/09/add-a-geo-field-to-iphone-and-address-book; Feb. 9, 2009.

The Media Center Show No. 231—Tagging your photos—The Digital Lifestyle.com; http://thedigitallifestyle.com/w/index.php/2009/11/19/the-media-center-show-no-231-tagging-your-photos.aspx; published on Nov. 19, 2009 and retrieved on Jan. 2, 2013.

Communication under Rule 71(3)EPC Intention to Grant mailed on Jul. 15, 2013, in corresponding European patent application No. 10191445.5.

Office Action mailed on Oct. 8, 2013, in corresponding Canadian patent application No. 2,757,610.

Office Action mailed Nov. 25, 2014; in Canadian patent application No. 2,757,610.

* cited by examiner

AUTOMATIC FILE NAMING ON A MOBILE DEVICE

FIELD OF TECHNOLOGY

The subject matter herein generally relates to mobile devices, and more specifically relates to a system and method for automatic file naming on a mobile device.

BACKGROUND

With the advent of more robust electronic systems, advancements of mobile devices are becoming more prevalent. Mobile devices can provide a variety of functions including, for example, telephonic, audio/video, and gaming functions. Mobile devices can include mobile stations such as cellular telephones, smart telephones, portable gaming systems, portable audio and video players, electronic writing or typing tablets, handheld messaging devices, personal digital assistants, and handheld computers.

Mobile devices allow users to have an integrated device which can perform a variety of different tasks. For example, a mobile device can be enabled for each of or some of the following functions: voice transmission (cell phones), text transmission (pagers and PDAs), sending and receiving data for viewing of Internet websites, and multi-media messages. Additionally, mobile devices can include one or more applications such as a camera application for capturing photographs or videos, a map application or a navigation application for retrieving maps and directions to locations relative to the mobile device, personal information managing applications for managing calendars, address books, and other personal information, and word processing applications for composing documents on the mobile device. Furthermore, a mobile device application can be executed in conjunction with other applications programmed on the mobile devices. For example aspects of the map application can be executed in conjunction with an address book application to retrieve directions from the mobile device's current location to an address stored in the address book.

BRIEF DESCRIPTION OF THE DRAWINGS

Implementations of the present technology will now be described, by way of example only, with reference to the attached figures, wherein.

DETAILED DESCRIPTION

Figure 2:
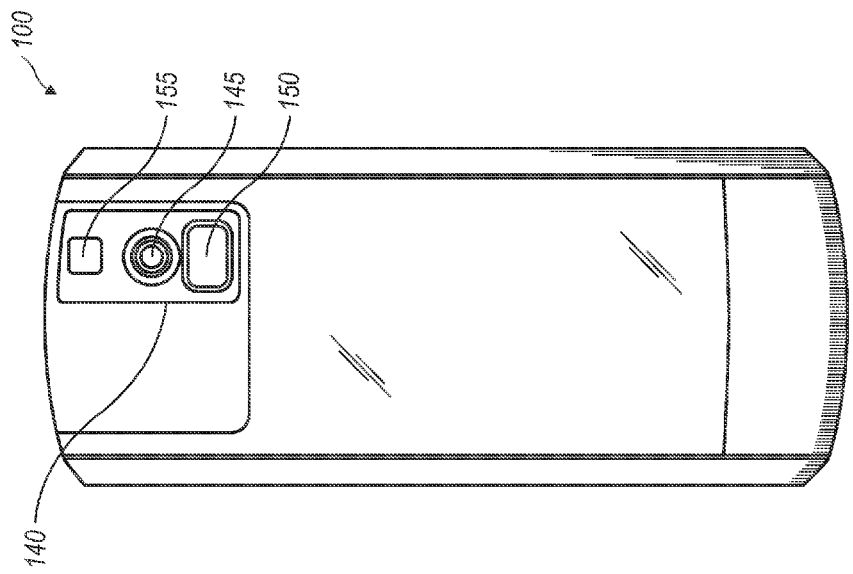
FIG. 2 is a view of the rear side of the exemplary mobile device illustrated in FIG. 1.

For simplicity and clarity of illustration, where appropriate, reference numerals have been repeated among the different figures to indicate corresponding or analogous elements. In addition, numerous specific details are set forth in order to provide a thorough understanding of the implementations described herein. However, those of ordinary skill in the art will understand that the implementations described herein can be practiced without these specific details. In other instances, methods, procedures and components have not been described in detail so as not to obscure the related relevant feature being described. Also, the description is not to be considered as limiting the scope of the implementations described herein.

Several definitions that apply throughout this disclosure will now be presented. The word "coupled" is defined as connected, whether directly or indirectly through intervening components, and is not necessarily limited to physical connections. The term "communicatively coupled" is defined as connected whether directly or indirectly though intervening components, is not necessarily limited to a physical connection, and allows for the transfer of data. The term "mobile device" is defined as any electronic device that is capable of at least accepting information entries from a user and includes the device's own power source. A "wireless communication" means communication that occurs without wires using electromagnetic radiation. The term "highlight" refers to altering the appearance of a graphical item displayed on the display screen to indicate that the graphical item has been selected for execution. For example, highlighting can include changing the color of the graphical item, changing the font or appearance of the graphical item, applying a background color to the graphical item, superimposing a block of semi-transparent color over the graphical item, placing a border around the graphical item, enlarging the graphical item as compared to other graphical items proximate to the highlighted graphical item, or other similar and known methods of highlighting graphical items or text items display on a display screen. The term "memory" refers to transitory memory and non-transitory memory. For example, non-transitory memory can be implemented as Random Access Memory (RAM), Read-Only Memory (ROM), flash, ferromagnetic, phase-change memory, and other non-transitory memory technologies.

The term "entry" refers to an event, appointment, or other happening identified on a calendar. A "personal information manager" refers to a software application programmed to function as a personal organizer. For example, the personal information manager can include a calendar, an address book, a contact list, a task list, an email manager, or other programs that provide personal information organization. A "geofence" is a user-defined or predefined geographical area defined by geographical boundary coordinates.

When mobile devices are enabled for photography and videography, typically, the captured photographs and videos are saved under a default filename that does not provide identifying information relating to the content of the photograph or video or the time and place the photograph or video was taken. Instead, the default filename is typically a combination of numbers and alphabetic characters that is generated in a numerical order as each photograph or video is captured. For example, conventional default filenames can be IMG0001, IMG0002, IMG0003, VID0001, VID0002, etc. Additionally, the files are typically saved under a single folder. Thus, a user cannot easily identify what the photograph or video is as the filename and the folder name do not contain terms that identify the content of the capture image or video, or the location or the time the image or video was captured. Instead, the user must rename the files to provide relevant information to assist in identifying and organizing the file in appropriate photo albums, video albums, or folders. That the user must rename the files reduces the user's efficiency in capturing videos and photos and can cause user frustration, as additional time is required to rename and organize the files. Accordingly, the present disclosure provides a system and method of automatically naming files on a mobile device.

The system and method of automatically naming files can include determining at least one of a current geographical location data of a mobile device, a current time data, and a current date data. A comparison of the at least one of the current geographical location data, the current time data, and the current date data can be made with at least one of a personal information manager (PIM) database and a geographical location (GL) database. A filename can be generated based on the comparison of the at least one of the current geographical location data, the current time data, and the current date data with the at least one of the PIM database and the GL database. Camera data, for example a photograph or video, can be received from a camera module on the mobile device. The automatically-generated filename can be applied to the camera data, and the camera data can be saved to a memory coupled to the mobile device. In at least one implementation, the generated filename can include a calendar entry associated with the current time, date, and geographic location at which the camera data was captured. In another implementation, the automatically-generated filename can include a contact from a contact list or address book and that is associated with the geographic location at which the camera data was captured.

As the filename can be generated based on a comparison of at least one of the current geographical location data, the current time data, and the current date data with the at least one of the PIM database and the GL database, the filename contains relevant information pertaining to the content of the camera data or the geographical location, the date, and the time the camera data was captured. With such a filename, the user can efficiently organize and save the camera data to the user's mobile device without having to spend extra time viewing each file and renaming the file with relevant terms to assist in organizing the files in a logical manner.

Figure 1:
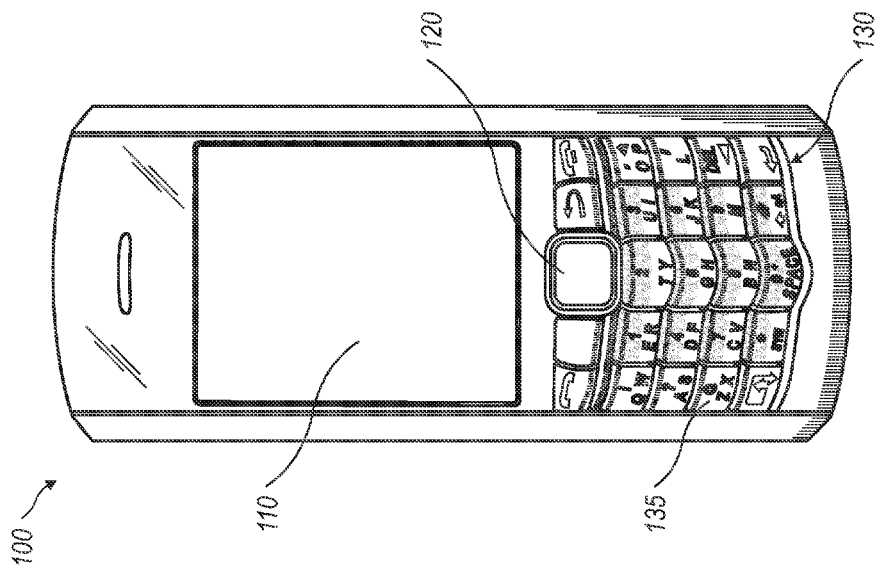
FIG. 1 is a view of the front of an exemplary mobile device configured for automatic file naming in accordance with an exemplary implementation of the present technology.

FIG. 1 illustrates a front view of an exemplary mobile device configured to automatically name files. The illustrated mobile device 100 is a cellular phone but can also be a smartphone, an electronic camera, a netbook, a global position system (GPS) device, an electronic tablet, an electronic pad, a personal digital assistant (PDA), or any other similar electronic device which includes a display, a processor communicatively coupled to the display, and a camera module. The mobile device 100 includes a display screen 110 on which photos, videos, user interfaces (UIs), or any other graphical item can be displayed. The display screen 110 can be a liquid crystal display (LCD), a light emitting diode (LED) display, an active matrix organic light emitting diode (AMOLED) display, a nanocrystal display, a nanotube display, a touch-sensitive display screen, or any other display screen on which graphical or visual items can be displayed. Below the display screen can be a navigation tool 120, such as an optical trackpad as illustrated in FIG. 1. However, one of ordinary skill in the art will appreciate that the navigation tool 120 can also be an optical trackball, a trackball, a jogball, a jog dial, an omnidirectional joystick, or any other navigation tool at which inputs can be received and output to alter the display screen 110. In FIG. 1, a keyboard 130 having a plurality of keys 135 can be positioned below the navigation tool 120. In the illustrated implementation, each key 135 of the keyboard 130 bears at least one of an alphabetic, numeric, symbolic, or functional indicia. The indicia signify the data to be input upon actuation of the key 135 bearing the indicia. In FIG. 1, the keyboard 130 is a reduced keyboard, where at least one key 135 is associated with more than one alphabetic indicia. In an alternative implementation, the keyboard 130 can be a full keyboard having each key 135 associated with an alphabetic indicia. The indicia on the keys 135 of the keyboard 130 in FIG. 1 are arranged in a QWERTY keyboard layout; however, one of ordinary skill in the art will appreciate that the keyboard layout can be an AZERTY layout, a QWERTZ layout, a DVORAK layout, a pinyin Chinese keyboard layout, or any other keyboard layout that allows a user to input alphabetic, numeric, symbolic, and functional indicia. The keys 135 can be press-actuable keys, touch-sensitive keys, capacitive keys, or any other similar key that allows for the input of data to a processor of the mobile device 100 upon user-engagement with the key 135.

FIG. 2 is a rear view of the exemplary mobile device 100 illustrated in FIG. 1. A camera module 140 can be on the rear side of the mobile device 100. In at least the implementation illustrated in FIG. 2, the camera module 140 can include a camera lens 145 coupled to an image sensor (not shown), a flash module 155, and a mirrored surface 150. Images sensed by the camera lens 145 can be captured as photographs or videos using a camera application executed by a processor (not shown) communicatively coupled to the camera module 140. The flash module 155 can provide light to assist in exposing the object or objects to be captured as a photograph or video by the camera lens. In other implementations, the configuration of the flash module 155, camera lens 145, and mirrored surface 150 can be located in different positions relative to one another as well as different positions on the backside of the mobile device 100. In at least one implementation, the flash module 155, camera lens 145 and mirror 150 can be located on the front side of the mobile device 100.

Figure 3:
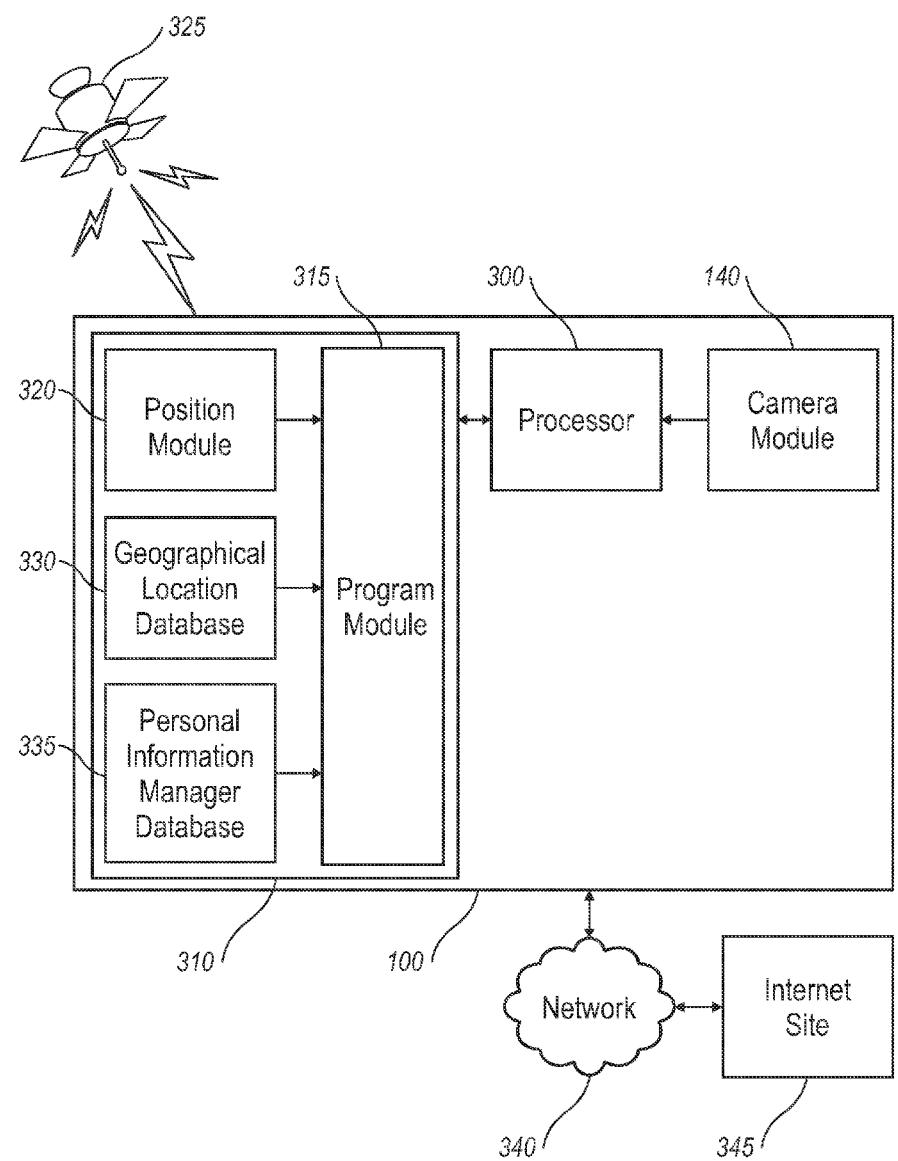
FIG. 3 is a block diagram representing the interaction between a processor and a program module programmed for automatic file naming on a mobile device in accordance with an exemplary implementation of the present technology.

FIG. 3 is a block diagram of a mobile device 100 to automatically generate filenames for camera data captured by the camera module 140 of the mobile device 100. A processor 300, the camera module 140, and at least one computer readable medium 310 can be coupled to the mobile device 100. Both the camera module 140 and the computer readable medium 310 can be communicatively coupled to the processor 300. At least one program module 315 can be stored on the at least one computer readable medium 310. A position module 320, a geographical location (GL) database 330, and a personal information manager (PIM) database 335 can also be stored on the at least one computer readable medium 310, and each database can be communicatively coupled to the processor 300. For example, the processor 300 can execute instructions from the program module 315 to search for information contained in the GL database 330 and the PIM database 335. The program module 315 can be operable, upon execution by the processor 300, to generate a filename for camera data captured by the camera module 140. For example, the program module 315 can be operable, upon execution by the processor 300 to: determine at least one of a current geographical location data, a current time data, and a current date data; compare the at least one of the current geographical location data, the current time data, and the current date data to either or both of the PIM database 335 and the GL database 330; generate a filename based on the comparison; and apply the filename to the camera data.

In FIG. 3, the position module 320 can be operable upon execution by the processor 300 to determine the current geographical position of the mobile device 100. For example, the position module 320 can be a geographical positioning system (GPS) that communicates with a satellite 325 to determine the current position of the mobile device 100. In an alternative implementation, the position module 320 can be a positioning system that communicates with a communications network system, a triangularization system, or any other system that allows for determining the location or position of a mobile device 100.

The GL database 330 can include at least one of a collection of maps, a collection of addresses, a business directory, a residential directory, a collection of geofences (which will be described in later paragraphs), or any other collection of geographical locations which can be identified by geographical coordinates. The GL database 330 can provide the geographical coordinates that are close in proximity to or that match the current location of the mobile device 100 determined by the position module 320.

The PIM database 335 can include at least one of an electronic calendar, an electronic list of contacts (for example, an address book), a document manager, a photo album, a media manager, an email manager, an email-address book, a task list, or any other collection of personal information and files. In at least one implementation, the processor 300 can execute instructions from a program module 315 to search the PIM database 335 and the GL database 330 to determine if there is a match with at least one of the current geographical location, the current date, and the current time of the mobile device 100.

In at least one alternative implementation, the program module 315 can be configured to interact with a network 340 to access an internet site 345 to determine if there is a match between the current geographical location, the current date, and the current time of the mobile device 100 and information stored on an internet site 345. For example, in at least one implementation, the processor 300 can execute instructions from the program module 315 to access an internet-based business directory or internet-based map database to determine the geographical location closest in proximity to or matching the current geographical location of the mobile device 100. In another implementation, the processor 300 can execute instructions from the program module 315 to access an internet-based social network to determine if the current geographical location, the current date, and the current time match an event or happening posted on the social network or the address of a contact within the social network. In another implementation, the GL database 330, PIM database 335, or both can be stored on an internet site or an internet-based database, which the program module 315 can access.

Regardless of how the processor 300 can execute instructions from the program module 315 to determine whether there is a match between the at least one of a current geographical location data, a current time data, and a current date data and data contained in the PIM database 335, the GL database 330, the internet site 345, the program module 315, or a combination thereof, the program module 315 is operable upon execution by the processor 300 to automatically generate a filename based on the comparison, thereby providing a relevant and useful filename for the camera data. Accordingly, the user can easily determine the content of the camera data and efficiently organize the camera data on the mobile device 100 with such a relevant filename.

Figure 4:
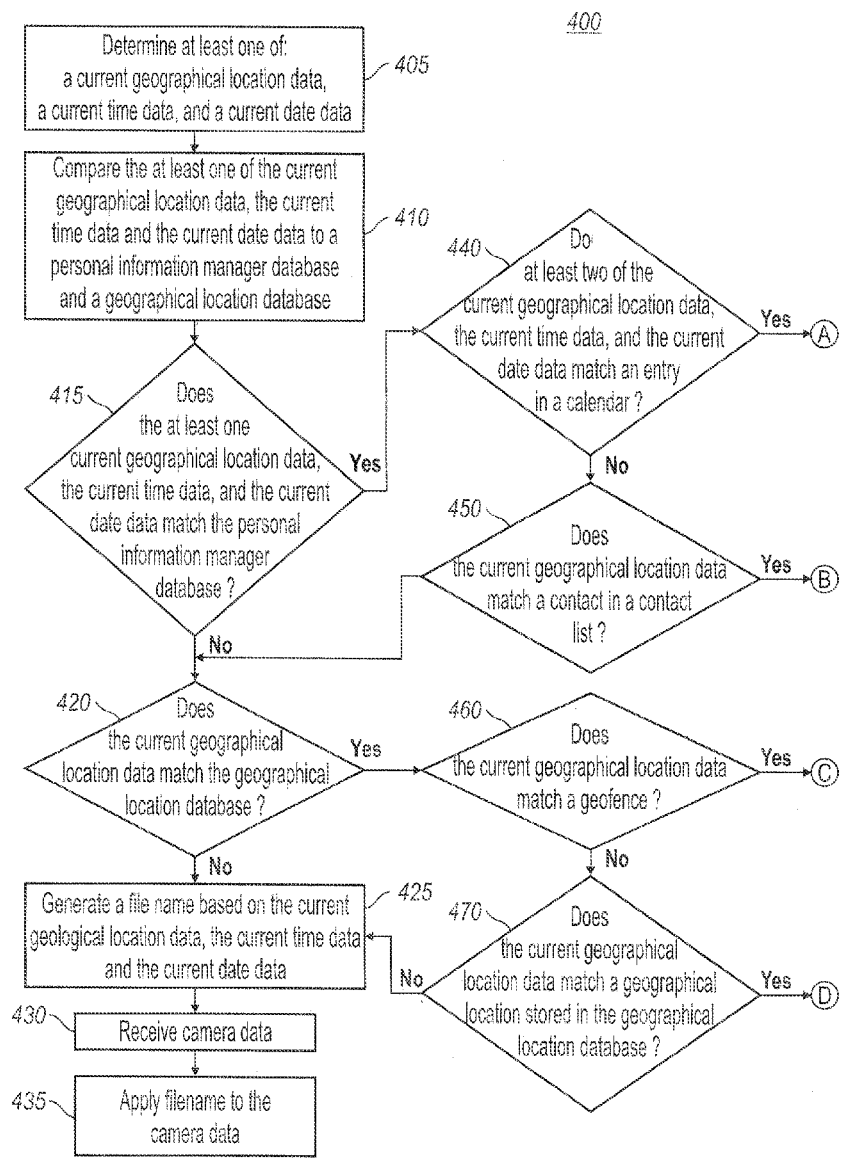
FIG. 4 is a flow chart of an exemplary implementation of a method of automatic file naming on a mobile device.
Figure 4:
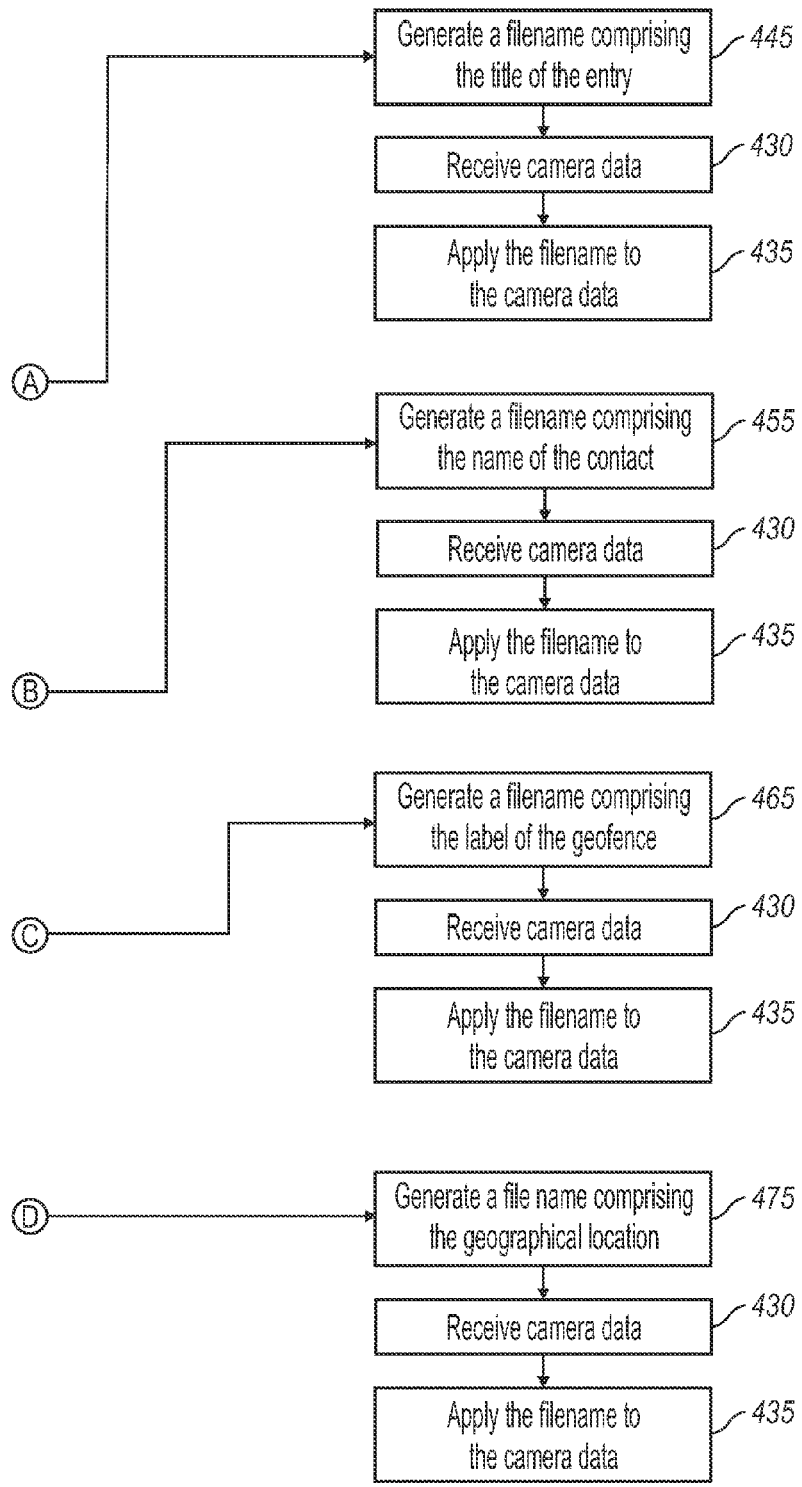

FIG. 4 is a flow chart of an exemplary implementation of a method 400 for automatic file naming on a mobile device 100. The method 400 can be executed by one or more processors communicatively coupled to the mobile device 100. At block 405, the processor 300 (shown in FIG. 3) can execute instructions from the at least one program module 315 (also shown in FIG. 3) to determine at least one of a current geographical location data of the mobile device, a current time data, and a current date data. At block 410, the processor 300 can compare the at least one of the current geographical location data, the current date data, and the current time data to a PIM database 335 and a GL database 330 (both shown in FIG. 3).

A determination can be made if there is a match between the at least one of the current geographical location data, the current date data, and current time data with data contained in the PIM database 335 and the GL database 330. For example, at block 415, the processor 300 can determine whether the at least one current geographical location data, the current time data, and the current date data matches data in the PIM database 335. If a match is made, a determination is made if at least two of the current geographical data, the current time data, and the current date data match a calendar entry in the PIM database 335 at block 440. If there is a match, at least one of the processor 300 or the program module 315 can generate a filename comprising the title of the calendar entry at block 445. Then, the processor 300 can receive the camera data at block 430, and apply the generated filename comprising the title of the calendar entry to the camera data at block 435.

If, however, at least two of the current geographical location data, the current time data, and the current date data do not match an entry in the calendar, the processor 300 can determine whether the current geographical location data matches a contact stored in the PIM database at block 450. If the current geographical location data matches a contact, the processor 300 can generate a filename comprising the name of the contact at block 455. For example, if the current geographical location data matches or is substantially close in proximity to an address associated with a contact, the processor 300 can generate a filename comprising the name of the contact associated with the address. In another implementation, the processor 300 can determine whether a phone number associated with a contact is associated with the current geographical location data. The processor 300 can receive camera data at block 430 and apply the generated filename comprising the name of the contact at block 435.

If the at least one current geographical location data, the current time data, and the current date data do not match data stored in the PIM database 335, or if the current geographical location data does not match a contact in a contact list stored in the PIM database 335, the processor 300 can make a determination if the current geographical location data matches data in the GL database at block 420. If there is a match, a determination is made whether the geographical location data matches a geofence stored in the GL database at block 460. The geofence can be a geographical area that is pre-defined, for example by the user, the software developer, the mobile device manufacturer, the service provider, or any other person or entity. In at least one implementation, the geofence will have boundary coordinates and a label. For example, a geofence can be defined by a set of longitudinal and latitudinal coordinates and can have a label such as "School." If the current geographical location data matches a geofence, the processor 300 can generate a filename comprising the label of the geofence at block 465. The processor 300 can receive camera data (block 430) and apply the filename comprising the label of the geofence to the camera data (block 435). Thus, when camera data is received at a location within the boundary of the geofence, the processor 300 can determine that the camera data is being captured within the geofence and can apply a filename comprising the geofence label to the camera data. With such a filename, the user of the mobile device can easily identify the content of the camera data as being associated with the geofence (for example, camera data having a filename containing the geofence label "School" can indicate that the camera data includes images of schoolmates, teachers, and classrooms). Further details and an illustrative example of a geofence will be described in relation to FIGS. 12-14.

If the current geographical location data does not match a geofence stored in the GL database 330, a determination can be made if the current geographical location data matches a geographical location stored in the GL database at block 470. In at least one implementation the GL database 330 can include geographical locations, such as addresses and maps having geographical coordinates defining cities, countries, venues, restaurants, buildings, and other locales. If the current geographical location data matches a geographical location in the GL database, the processor 300 can generate a filename comprising the geographical location at block 475. The processor 300 can receive camera data (block 430) and apply the generated filename having the geographical location to the camera data (block 435). For example, if the current geographical location data matches the coordinates of the city of Miami stored on a map in the GL database 330, the processor 300 can generate a filename comprising the name of the geographical location, Miami. The processor 300 can then apply the automatically-generated filename to a camera data received by the processor 300. While the geofence has been described as directly stored in the GL database 330, one of ordinary skill in the art will appreciate that the geofence can be stored in a separate database or in a sub-database of another database coupled to the GL database 330.

If the geographical location data, the current time data, and the current date data do not match information contained in the PIM database 335 or the GL database 330, the processor 300 can generate a filename based on the current geographical location data, the current date data, and the current time data at block 425. For example, the processor 300 can generate a filename comprising at least one of the current geographical location data, the current date data, and the current time data. The processor 300 can receive camera data (block 430) and apply the generated filename to the camera data (block 435). In the method 400 illustrated in FIG. 4, the resulting generated filename will comprise relevant information pertaining to at least one of the content of the camera data, the time the camera data was captured, and the place where the camera data was captured. Such relevant information can allow the user to easily identify the file for retrieval and organization without having to rename the file after the camera data is captured.

As the PIM database 335 can comprise more specific and personalized information than the GL database 330, generating filenames with the more specific and personalize information from the PIM database 335 as the first naming element and the GL database 330 as the second naming element can allow the user to easily distinguish a file from other files stored on a memory and organize the file in appropriate folders. For example, as the PIM database 335 and the GL database 330 can have different geographical information that can match the current geographical location data of a mobile device, the method 400 can determine a match with the PIM database 335 first, as the geographical information stored on the PIM database 335 can correspond to more specific information than information stored in the GL database 330. For example, geographical information can correspond to as a contact or a calendar entry stored in the PIM database 335 and can provide more specific information relating to the content of the camera data than a location stored in the GL database 330. Accordingly, the processor 300 can determine whether there is a match between the current geographical location data, the current time data, and the current date data with the PIM database 335 before comparing the current geographical location data, the current time data, and the current date data with the GL database 330, as illustrated in FIG. 4. Additionally, by comparing the current geographical location data, the current time data, and the current date data with the PIM database 335 before the GL database 330, errors in generating filenames can be minimized in the event the current geographical location data matches information in both the PIM database 335 and the GL database 330.

Although the present figures and exemplary implementations have described particular orders for the steps of the method of automatic file naming, one of ordinary skill in the art will appreciate that the order of the steps illustrated in the present figures and described herein are for exemplary purposes, and the steps can be performed in a different order than as illustrated and described to achieve the technical benefits described herein. For example, in at least one implementation, if files stored on the memory of a mobile device are primarily organized by geographical locations, the method of generating a filename can determine a match between the current geographical location data and the GL database 330 before determining a match with the PIM database 335. Additionally, fewer or more steps than illustrated in FIG. 4 can be included.

Figure 5:
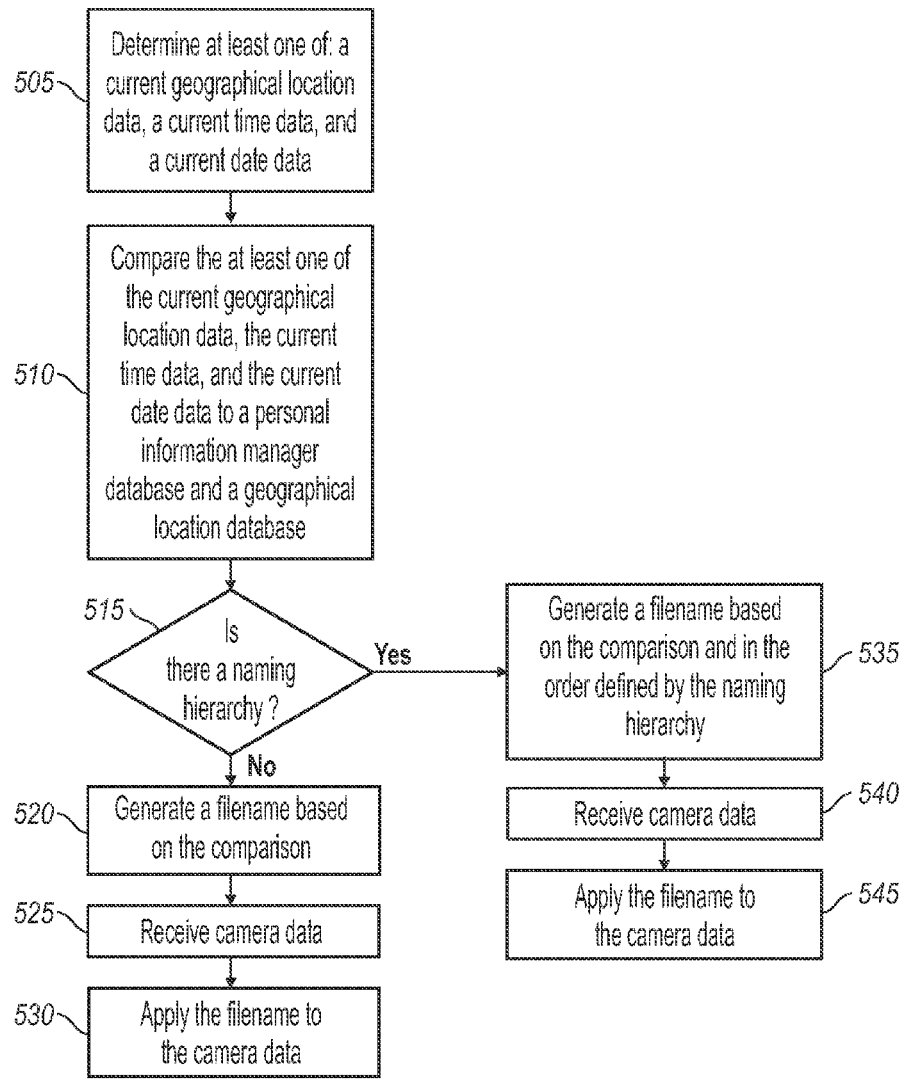
FIG. 5 is a flow chart of an alternative exemplary implementation of a method of automatic file naming on a mobile device, where the method includes a naming hierarchy.

FIG. 5 is an alternative implementation of the method of automatic file naming disclosed herein. The method 500 illustrated in FIG. 5 is similar to the method 400 illustrated in FIG. 4 in that the method 500 includes the processor 300 determining at least one of a current geographical location data, a current time data, and a current date data at block 505 and comparing the current geographical location data, the current time data, and the current date data at block 510. The method 500 in FIG. 5 differs from the method 400 in FIG. 4 in that the method 500 includes a naming hierarchy. At block 515, a determination can be made if there is naming hierarchy, for example by the processor 300. If there is a naming hierarchy, the filename can be generated based on the comparison of the current geographical location data, the current time data, and the current date data with information contained in the PIM database 335 and the GL database 330 and in the order defined by the naming hierarchy at block 535.

A naming hierarchy can be a set of instructions or rules indicating the order of naming elements forming the automatically-generated filename. The instructions can be stored on the computer readable medium 310 and can be executed by the processor 300 of the mobile device 100. For example, if at least one of the current geographical location data, the current time data, and the current date data matches both a contact contained in the PIM database 335 and a geographical location contained in the GL database 330, the naming hierarchy can indicate that the generated filename comprise the name of the contact as the first naming element followed by the geographical location as the second naming element. In another implementation, if the current geographical location data, current time data, and current date data matches both a calendar entry and a contact contained in the PIM database 335, the naming hierarchy can indicate that the filename first comprise the name of the contact as the first naming element, followed by the title of the calendar entry as the second naming element. In yet another implementation, if the current geographical location data, the current time data, and the current date data matches both a calendar entry contained in the PIM database 335, the naming hierarchy can indicate that the filename comprise the current date data as the first naming element followed by the title of the calendar entry as the second naming element. While the exemplary implementations described herein contain a combination of two naming elements, other combinations and orders of naming elements can be considered. For example, a naming hierarchy containing three or more naming elements. An illustrated exemplary implementation of a naming hierarchy will be described in relation to FIG. 7.

In FIG. 5, if there is a naming hierarchy and a filename is generated in the order defined by the naming hierarchy, the processor 300 can receive camera data at block 540 and apply the generated filename to the camera data at block 545. If, however, there is no naming hierarchy at block 515, a filename can be generated, by the processor 300 for example, based on the comparison of the current geographical location data, the current time data, and the current date data to the information contained in the PIM database 335 and the GL database 330 and in a default order of naming elements. The processor 300 can receive camera data at block 525 and can apply the generated filename to the camera data at block 530. Similar to the method 400, the resulting filename generated in the method 500 in FIG. 5 will comprise relevant information pertaining to at least one of the content of the camera data, the time the camera data was captured, and the place where the camera data was captured. Such relevant information allows the user to easily identify the file for retrieval and organization without having to rename the file after the camera data is captured. As the filename is generated according to a predefined naming hierarchy, the efficiency and ease of organizing the files can be enhanced. For example, files having common first naming elements can be grouped together for easy identification and organization when the files are sorted by the filenames in an alphabetic order.

The instructions or rules for comparing the current geographical location data, the current time data, and the current date data to information contained in the PIM database 335 and the geographical information database 330 can be user-defined. For example, in FIG. 6, the user can define the instructions or rules for comparing the current geographical location data, the current time data, and the current date data to information contained in the PIM database 335 and the geographical information database 330 in an options menu 600, for example, a file manager options menu, a camera options menu, a settings menu, a media options menu, or any other menu having options for naming files.

Figure 6:
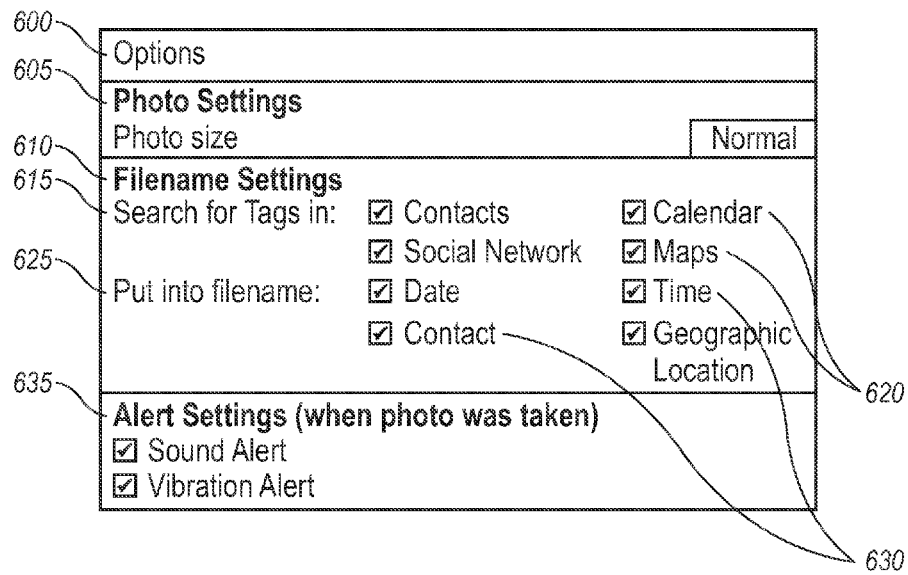
FIG. 6 is an exemplary screenshot of a camera options screen in accordance with an exemplary implementation of the present technology.

In the exemplary implementation in FIG. 6, the options menu 600 is a camera options menu that includes user-definable options for photo settings 605 (for example, defining the size of the photo), filename settings 610, and alert settings 635 for indicating that a photo is taken. The filename settings 615 can include the instructions identifying the information to which the current geographical location data, the current time data, and the current date data is compared. In FIG. 6, the setting "Search for Tags in" 615 can identify which sub-databases within the PIM database 335 and the GL database 330 to search for comparisons with the current geographical location data, the current date data, and the current time data. For example, in FIG. 6, the information contained in the GL database 330 and the PIM database 335 are referred to as tags and can include the titles of calendar entries, the names of contacts in the contact lists, the name of contacts in a social network, the labels of geofences, the labels of locales identified on maps, or any other information which can be compared to the current geographical location data, the current time data, and the current date data.

As illustrated in FIG. 6, the "Search for Tags in" setting 615 can include a plurality of user-selectable options 620 that are checkboxes, however other user-selectable options can be implemented. For example, the user-selectable options 620 can be radio buttons, a pull-down menu, toggle buttons, or any other graphical item which can be user-selectable. In FIG. 6, the user-selectable options 620 can be associated with searchable sub-databases of the PIM database 335 and the GL database 330. In FIG. 6, each of the user-selectable options 620 is checked which can indicate that the processor 300 can search for information in the list of contacts, the social network, and the calendar sub-databases of the PIM database 335, as well as in the maps sub-database of the GL database 330. In other words, in FIG. 6, the selected user-selectable options 620 indicate that the processor 300 can compare the current geographical location data, the current date data, and the current time data to addresses and phone numbers stored in the list of contacts and the social network sub-database; dates, times, and geographical locations associated with entries in the calendar; and geographical locations identified in the maps sub-database of the GL database 330. While all the user-selectable options 620 are selected in FIG. 6, fewer user-selectable options 620 can be selected, including no user-selectable options 620. Also, while FIG. 6 illustrates six specific sub-database, other sub-databases can be included or instead of those illustrated. For example, the sub-databases can include a geofences sub-database, a task sub-database, or any other sub-database that can be contained in the PIM database 335 or the GL database 330.

Also illustrated in FIG. 6, the options menu 600 can include a "Put into filename" setting 625 which can allow the user to define which information to include in the filename generated by the processor 300. For example in FIG. 6, the "Put into filename" setting 625 includes user-selectable information 630 which can be included as naming elements of the generated filename. For example, the user-selectable information 630 can be check boxes, as shown in FIG. 6, or can be radio buttons, toggle buttons, a pull-down menu, or any other graphical element which can be selected by the user. Additionally, the user-selectable information 630 illustrated in FIG. 6 can indicate that information relating to the date, a contact, the time, and a geographical location can be included as naming elements of the generated filename. For example, in FIG. 6, as each user-selectable information 630 is selected, the resulting generated filename will include the current date, the current time, the name of the contact matching the current geographical location data (if any), and the current geographical location matching the current geographical location data as naming elements of the generated filename. While FIG. 6 illustrates each user-selectable information 630 selected, one of ordinary skill in the art will appreciate that fewer user-selectable information 630 can be selected than as illustrated. Also, while FIG. 6 illustrates four user-selectable information 630 to choose from, one of ordinary skill in the art will appreciate that fewer or more user-selectable information 630 can be displayed than as illustrated. Additionally, other user-selectable information 630 can be included or instead of the user-selectable information 630 illustrated in FIG. 6. For example, user-selectable information 630 such as a calendar entry, geofence, current locale, or any other information relevant to the camera data can be included in the user-selectable information 630 of the "Put into filename" option 625.

Figure 7:
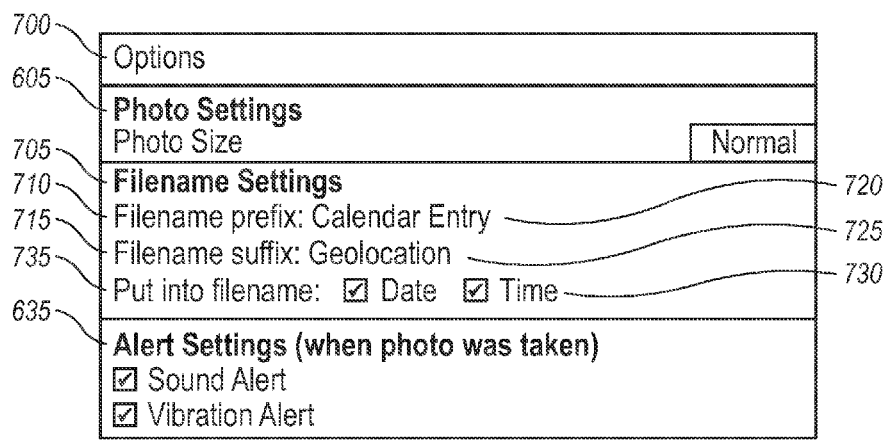
FIG. 7 is an alternative exemplary screenshot of a camera options screen in accordance with an exemplary implementation of the present technology having a naming hierarchy.

FIG. 7 is an alternative implementation of an options menu 700 from which at least some of the instructions for automatically generating a filename for camera data can be defined. The options menu 700 illustrated in FIG. 7 is similar to the options menu 600 illustrated in FIG. 6 in that the menu 700 includes Photo Settings 605 and Alert Settings 635 to indicate when a photo is taken. The menu 700 illustrated in FIG. 7 differs from the menu 600 illustrated in FIG. 6 in that the Filename Settings 705 illustrated in FIG. 7 includes a setting for defining a naming hierarchy. In the illustrated implementation, the Filename Settings 705 can include options such as a Filename prefix 710, a Filename suffix 715, and a "Put into filename" option 735. The Filename prefix 710 can be a user-definable option allowing the user to specify which information or data can be used as the first naming element of the generated filename. The first naming element 720 to be used as the Filename prefix can be selected from a drop-down menu, a plurality of radio buttons, a plurality of toggle switches or any other presentation of a user-selectable options for the naming element. In FIG. 7, the selected first naming element 720 can be the title of the Calendar Entry matching at least two of the current geographical location data, the current time data, and the current date data. However, one of ordinary skill in the art will appreciate that other information, such as a geofence label, a name of a contact, or any other information relevant to the camera data captured can be selected. Additionally, one of ordinary skill in the art will appreciate that in at least one implementation, the user can specify that the generated filename include no filename prefix by selecting an option such as "none" or "no" in the Filename prefix option 710.

FIG. 7 also illustrates a Filename suffix 715 option which can allow the user to specify which information or data is used as the last naming element of the generated filename. For example, in the illustrated implementation, the last naming element 725 to be used in the Filename suffix 715 can be selected from a drop-down menu, a plurality of radio buttons, a plurality of toggle switches or any other presentation of a user-selectable options for the naming element. In FIG. 7, the selected last naming element 725 can be the geolocation or the geographical location matching the current geographical location data of the mobile device 100. However, one of ordinary skill in the art will appreciate that other information, such as a geofence label, the current date, the current time, a name of a contact, or any other information relevant to the camera data captured can be selected. Additionally, one of ordinary skill in the art will appreciate that in at least one implementation, the user can specify that the generated filename include no filename suffix by selecting an option such as "none" or "no" in the Filename suffix option 715. While FIG. 7 illustrates options for selecting a Filename prefix and a Filename suffix, options for selecting other naming elements can be included, for example, a second naming element, a third naming element, or other intermediary naming elements.

Also illustrated in FIG. 7, the options menu 700 can include a "Put into filename" option 735 that allows the user to select additional information which can be included in the filename. In FIG. 7, the "Put into Filename" option 715 includes user-selectable options 730 for the current date and the current time. The user-selectable option 730 can be presented as selectable check-boxes, radio buttons, toggle buttons, a drop-down menu, or any other graphical representation of user-selectable options. In FIG. 7, the user-selectable option 730 for both the date and the time are checked. In the illustrated options menu 700 in FIG. 7, the resulting generated filename will comprise the title of a calendar entry matching at least one of the current geographical location data, the current date data, and the current time data as the first name element, followed by the current date and the current time as the intermediary naming elements, and the geolocation matching the current geographical location data as the last naming element. While the illustrated implementation shows each of the user-selectable options 730 being selected for the "Put into filename" option 735, one of ordinary skill in the art will appreciate that fewer user-selectable options 730 can be selected than as illustrated, including no selection of the user-selectable options 730. Also, one of ordinary skill in the art will appreciate that fewer or more user-selectable options 730 can be displayed in the "Put into filename" option 735. For example, the user-selectable options 730 can include the name of a contact, a geofence label, an address, or any other information relevant to the camera data captured by the camera module.

Figure 8:
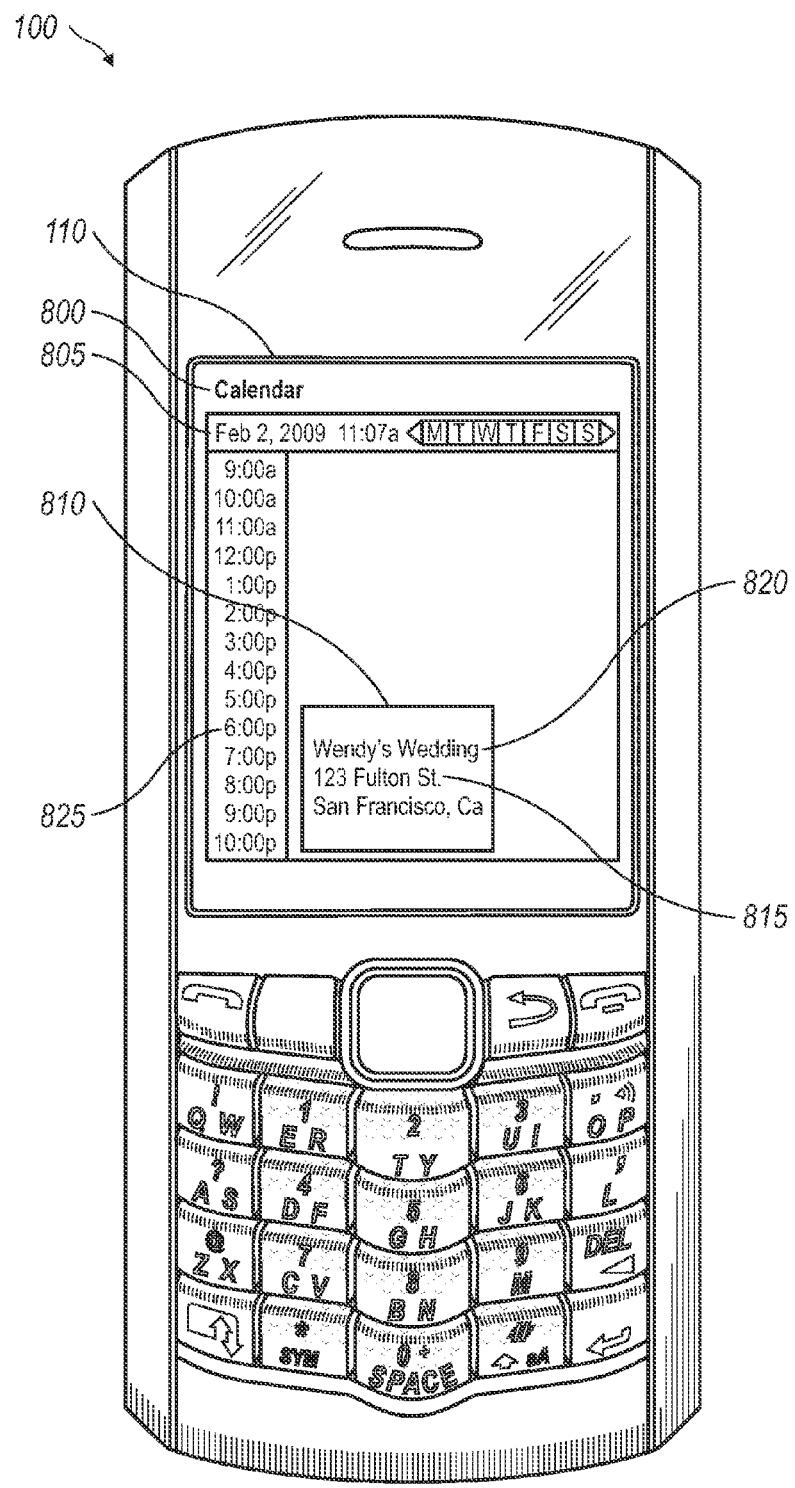
FIG. 8 is an illustration of a mobile device configured for automatic file naming in accordance with an exemplary implementation of the present technology, where a calendar application is displayed on the display screen of the mobile device.

FIG. 8 is an illustration of a calendar sub-database associated with the PIM database 335. In FIG. 8, the calendar sub-database can be presented as a calendar application 800 on the display screen 110 of the mobile device 100. The calendar application 800 can display a specific date 805 divided into the times during the day, and a plurality of calendar entries 810 scheduled on the specific date 805. In the implementation illustrated in FIG. 8, the specific date 805 is Feb. 2, 2009, and the times 825 are illustrated as the hours within a day, but the times 825 can be shown in any division of time during the specific date 805 or dates illustrated on the calendar 800. For example, if the calendar entry 810 takes place over several days on the calendar 800, the times 825 can be illustrated as the days which the calendar entry 810 covers. In another implementation, the times 825 can be illustrated as each odd-numbered hour, each even-numbered hour, the hours counted in multiples of five, each half-hour, or any other division of time covering the duration of the calendar entry 810.

Also illustrated in FIG. 8, the calendar entry 810 scheduled on the specific date 805 is identified by a graphical element bearing a title 820 and a location 815. The duration of the entry 810 is identified by the size of the graphical element and the times 825 associated with the size of the graphical element. Specifically, in FIG. 8, the graphical element representing the calendar entry 810 is a block having a title 820 of "Wendy's Wedding" and a location 815 corresponding to the venue of Wendy's Wedding. The size of the graphical element corresponds to the hours 825 of 5:30 p-10:00 p, indicating the duration of the calendar entry 810. Thus, in FIG. 8, the illustrated calendar 800 indicates that the mobile device user is scheduled to attend a wedding on Feb. 2, 2009 from 5:30 p-10:00 p at the address 123 Fulton St., San Francisco, Calif. With such information, the processor 300 of the mobile device 100 can determine if at least two of the current date data, the current time data, the duration, and the current geographical location data match the date 805, the times 825, and the location 815 of the calendar entry 810. If the processor 300 determines a match, the processor 300 can generate a filename comprising the title 820 of the calendar entry 810. For example, if the current date data matches the date of the calendar entry 810 and the current time falls within the duration of times 825 of the calendar entry 810, the processor 300 can generate a filename comprising the title of the calendar entry 810.

In an alternative implementation, the processor 300 of the mobile device 100 can verify the attendance of the entry 810 in the calendar 800 in the event the current geographical location data and at least one of the current date data and the current time data matches the location, the date, the time, and the duration of the calendar entry 810. For example, in FIG. 8, if the processor 300 of the mobile device 100 determines that the current geographical location data is substantially proximate to the address 815 of Wendy's Wedding, and either or both the current date data matches the date 805 on the calendar 800 and the current time data falls within the duration of the times 825 of Wendy's Wedding, the processor 300 can verify the attendance of the calendar entry 810 and generate a filename comprising the title 820 of the calendar entry 810. In other words, if the processor 300 verifies the attendance of the calendar entry 810 based on the current geographical location data, the current time data, and the current date data, the processor 300 can automatically generate a filename for any camera data captured at the location 815 of the calendar entry 810 and during the duration of the calendar entry 810. For example, in the implementation illustrated in FIG. 8, camera data captured at the location of Wendy's Wedding and during the duration of Wendy's Wedding can have a generated filename that comprises the title 820 Wendy's Wedding. While FIG. 8 illustrates a calendar 800 having one calendar entry 810, one of ordinary skill in the art will appreciate that fewer or more than one calendar entry 810 can be displayed on the calendar 800.

Figure 9:
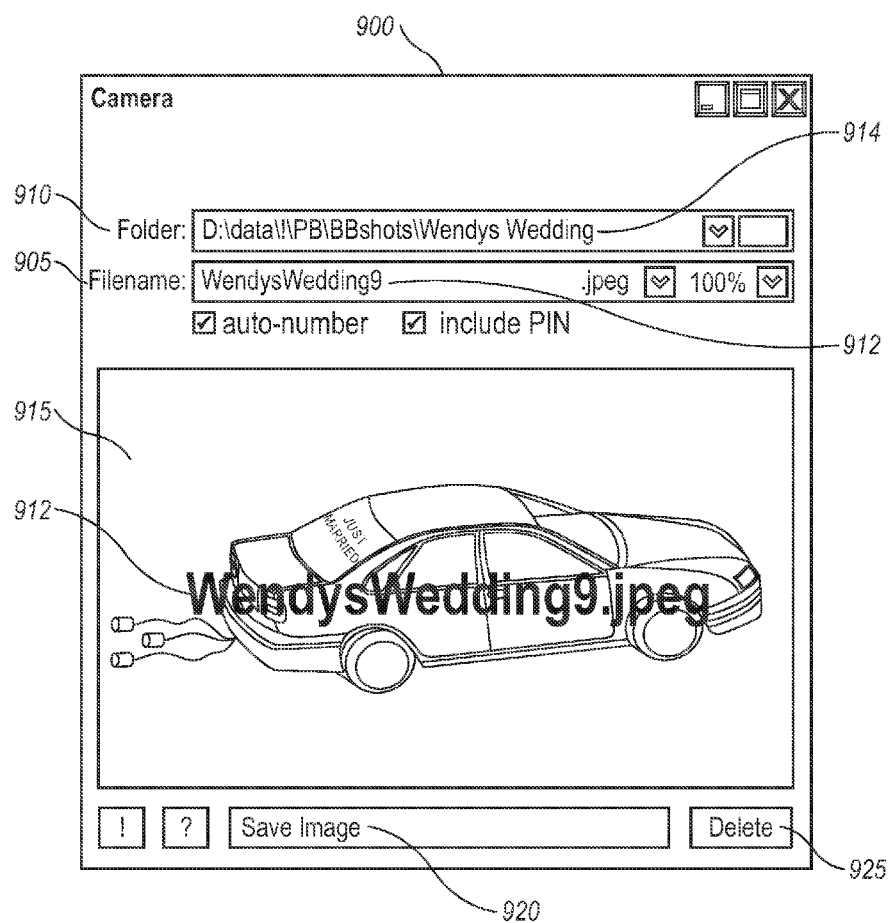
FIG. 9 is a screenshot of a camera application programmed on a mobile device configured for automatic file naming in accordance with an exemplary implementation of the present technology, where the automatic filename is generated based on the calendar entry illustrated in FIG. 8.

FIG. 9 illustrates an exemplary screenshot of the display screen of a mobile device configured to automatically generate a filename based on the calendar entry 810 illustrated in FIG. 8. Specifically, FIG. 9 illustrates a user interface 900 associated with an application for capturing camera data. The user interface includes a Folder name field 910, a Filename field 905, a preview of the camera data 915 captured, a Save Image 920 option to confirm saving the camera data 915, and a Delete 925 option to delete the camera data 915. In FIG. 9, the user interface 900 illustrates a camera data 915 that is a photograph captured by the camera module having at least two of the current geographical data, the current time data, and the current date data matching the location 815, the date 805, and the times 825 of the duration of the calendar entry 810 illustrated in FIG. 8. As the processor 300 has determined a match between at least two of the current geographical location data, the current date data, and the current time data with a calendar entry 810, the processor 300 can generate a filename comprising the title 820 of the calendar entry 810: Wendy's Wedding. Specifically, in FIG. 9, the generated filename 912 is Wendys Wedding 9, which can indicate that the camera data 915 was captured at least on the date and at the location of or during the duration of the calendar entry 810, Wendy's Wedding. Additionally, the generated filename 912 can indicate that the camera data 915 is the ninth camera data captured having the current geographical location data, the current date data, and the current time data match with at least two informational data of the calendar entry 810. As the generated filename 912 provides the user with relevant information pertaining to the content of the camera data and the location, time, and date of the camera data was captured, the generated filename 912 allows the user to easily and efficiently organize and identify the captured camera data 915 from other camera data or files stored on the mobile device 100.

Also illustrated in FIG. 9, the filename 912 can be overlaid over the preview of the camera data 915, thereby providing a prominent notification as to what filename was generated and will be applied to the camera data 912 in the event the camera data 915 is saved or stored on a memory coupled to the mobile device 100. While the illustrated implementation shows the filename 912 overlaid in the center of the preview of the camera data 915, one of ordinary skill in the art will appreciate that the generated filename 912 can be overlaid over any portion of the preview of the camera data 915. Also, in at least one implementation, the generated filename 912 need not be overlaid over the preview of the camera data 915. Additionally, while the illustrated implementation illustrates an opaque filename 912 overlaid over the preview of the camera data 915, one of ordinary skill in the art will appreciate that the filename 912 can be semi-transparent.

As illustrated in FIG. 9, the processor 300 (shown in FIG. 3) can create or select an appropriate folder in which to save the camera data 915. In one implementation, the processor 300 can create a folder for each new geographical location data determined or each new date data determined. In another implementation, the processor 300 can create a folder each time a filename is generated, where the folder name 914 comprises a portion of the filename 912. For example, in FIG. 9, the processor 300 can generate a folder name 914 comprising the title of the calendar entry 810. Additionally, the processor 300 can apply numbers as the suffix of the filename 912 to distinguish the camera data 915 from other captured camera data and from the folder. In another implementation, the processor 300 can search for a folder already stored in a memory coupled to the mobile device 100 that contains at least a portion of the generated filename 912 and can save the camera data 915 to that folder. While the processor 300 can automatically select the most relevant folder name 914 in which to save the camera data 915, in at least one implementation, the user interface 900 can include an option to allow the user to manually select the folder in which to save the camera data 915. For example, the option can be an option button or a pull-down menu from which the user can manually select a folder. Therefore, as the generated filename 912 and the folder name 914 comprise information relevant to at least one of the content of the camera data, the location, the date, and the time the camera data was captured, identification and organization of the files and camera data stored on the mobile device 100 is enhanced and the efficiency, intuitiveness, and user-friendliness of file management on a mobile device 100 can be increased.

Figure 10:
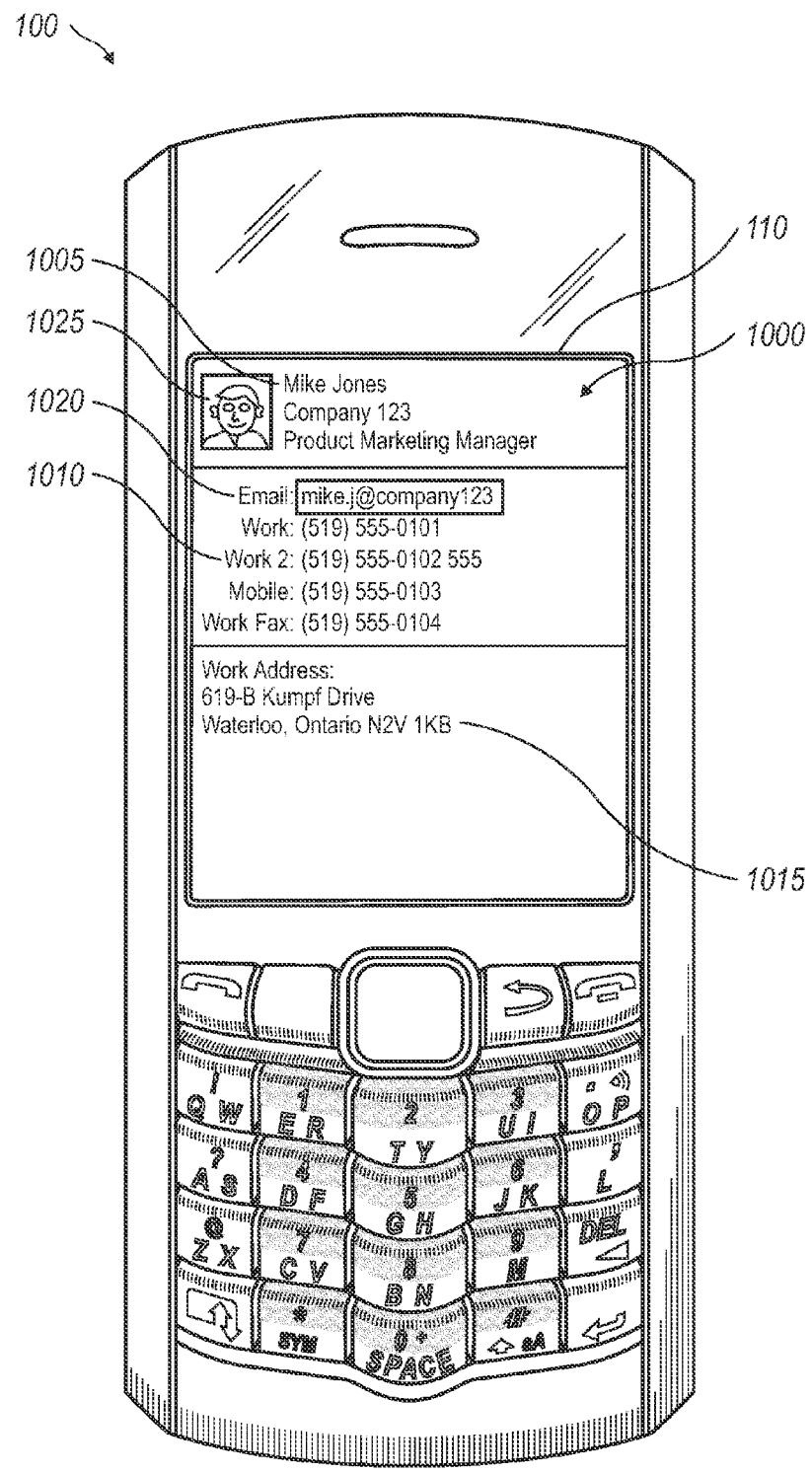
FIG. 10 is an illustration of a mobile device configured for automatic file naming in accordance with an exemplary implementation of the present technology, where a contact from a list of contacts is displayed on the display screen of the mobile device.

FIG. 10 is an illustration of a user interface for a contact list. In at least one implementation, the PIM database can include a contact list having a plurality of contacts 1000, such as addresses, email addresses, telephone numbers, and other identifying information of a person or business. In the exemplary implementation of FIG. 10, a contact 1000 from a contact list is displayed. The contact 1000 can include the name 1005 of the contact, a picture 1025 associated with the contact, an email address 1020, a plurality of phone numbers 1010, and an address 1015. While phone numbers 1010 can include work phone numbers, a mobile phone number, and a fax number as illustrated in FIG. 10, one of ordinary skill in the art will appreciate that fewer or more than the phone numbers illustrated in FIG. 10 can be implemented. Also, while only a work address 1015 is illustrated in FIG. 10, a home address or multiple addresses can be included. Additionally, other email addresses can be included in addition to or instead of the work email address 1020 illustrated in FIG. 10.

Figure 11:
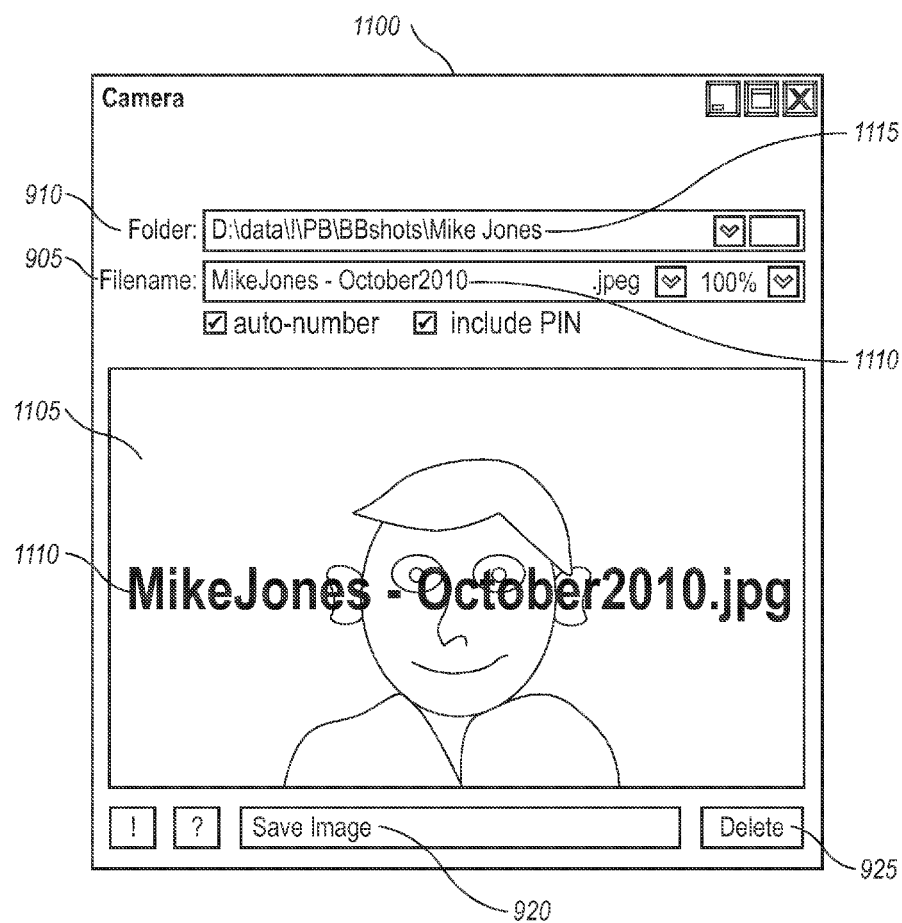
FIG. 11 is a screenshot of a camera application programmed on a mobile device configured for automatic file naming in accordance with an exemplary implementation of the present technology, where the automatic filename is generated based on the contact illustrated in FIG. 10.

FIG. 11 is an illustration of generating a filename when at least one of the current geographical location data, the current time data, and the current date data match the information associated with the contact 1000 illustrated in FIG. 10. The user interface 1100 for the camera application illustrated in FIG. 11 is similar to the user interface 900 illustrated in FIG. 9 in that the user interface 1100 includes a Folder name field 910, a Filename field 905, a preview of the camera data 1105 captured, a Save Image 920 option for confirming saving the camera data 1105, and a Delete 925 option to delete the camera data 1105. Additionally, FIG. 11 is similar to FIG. 9 in that the generated filename 1110 can be, but does not necessarily need to be, overlaid over the preview of the camera data 1105.

FIG. 11 differs from FIG. 9 in that the filename 1110 is generated based on a match of the current geographical location data with geographical location information contained in the PIM database 335 and associated with the contact 1000 illustrated in FIG. 10. In at least one implementation, the current geographical location data of the mobile device 100 matches the address 1015 associated with the contact 1000, which can indicate that the camera data 1105 was captured at or in close proximity to the address 1015 associated with the contact 1000. For example, in FIGS. 10 and 11, the processor 300 can determine that as the current geographical location data matches the address 1015 of the contact 1000 Mike Jones, the content of the camera data 1015 is related to Mike Jones (i.e., the name 1005 of the contact). Accordingly, the processor 300 can automatically generate a filename 1110 comprising the name 1005 of the contact. In FIG. 11, the filename 1110 can also include the current date. While the filename 1110 (MikeJones-October 2010) illustrated in FIG. 11 includes the month and the year of the current date, one of ordinary skill in the art will appreciate that the filename 1110 can also include the day or can include only the month or only the year of the current date. Alternatively, the filename 1110 can include the current time or can include a portion of or all of the date and the current time. Also similar to FIG. 9, the processor 300 can create or select a folder in which to save the camera data 1105. In FIG. 11, the processor 300 has searched and selected a folder named Mike Jones since the folder name 1115 comprises at least a portion of the generated filename 1110 MikeJones-October 2010. While FIG. 11 illustrates the selection of an already-existing folder stored on the memory coupled to the mobile device 100, in at least one implementation, the processor 300 can create a new folder comprising at least a portion of the generated filename 1110.

In another implementation, a determination that a match between the current geographical location data and information associated with a contact 1000 in a contact list can be based on a phone number 1010 associated with the contact 1000. For example, phone number 1010 are typically associated with a specific address, such as the address of the locale where the phone number originates or the billing address associated with the phone number. In at least one implementation, in the event the current geographical location data does not match an address saved in the contact 1000, the processor 300 can determine if the current geographical location data matches an address associated with a phone number saved in the contact 1000. Accordingly, the processor 300 can generate a filename comprising the name 1005 of the contact 1000, as the current geographical location data matches an address corresponding to a phone number associated with the contact 1000.

In FIG. 11, as the generated filename 1110 comprises the name of a contact 1000 saved in the PIM database 335 (shown in FIG. 3) of the mobile phone, the user is provided with information relating to the content of the camera data 1105 having the generated filename 1110. For example, the filename 1110 can indicate that the camera data 1105 is a photograph or video of the person associated with the contact 1000, a photograph or video taken at the home or workplace of the contact 100, or any other association between the contact 1000 and the content of the camera data 1105.

Figure 12:
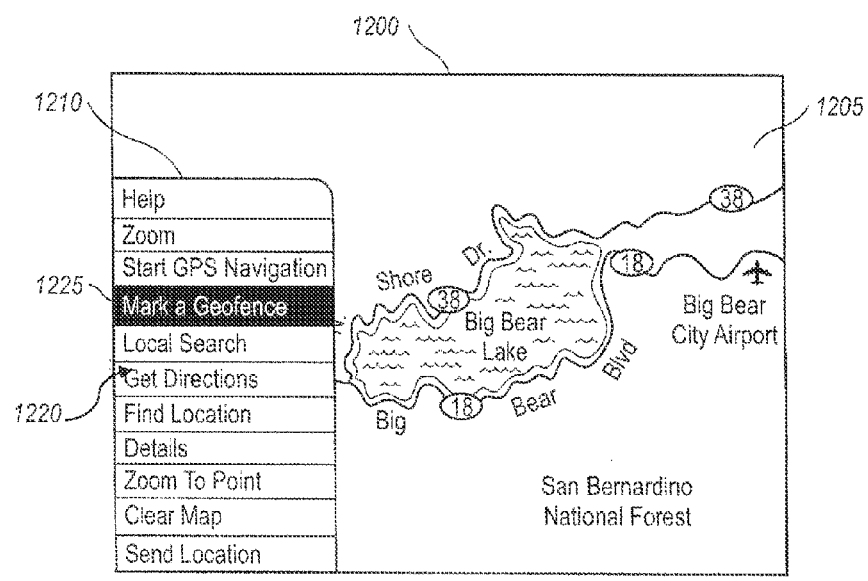
FIG. 12 is an exemplary screenshot of a map application programmed on a mobile device configured for automatic file naming, where the map application is programmed to mark geofences.

FIG. 12 is an exemplary implementation of a map application configured to define geofences. A graphical user interface 1200 of a map application is illustrated in FIG. 12 showing a map 1205 of a geographical location. A menu 1210 having a list of user-selectable options 1220 can be displayed on top of the map 1205. The list of user-selectable options 1220 provide options which allow the user to manipulate the map 1205 or retrieve additional information related to the map 1205. Specifically, in FIG. 12, a user selectable option 1225 for defining a geofence (e.g., the option 1225 labeled "Mark a Geofence") can be highlighted. Upon selection of the highlighted "Mark a Geofence" option 1225, additional options can be displayed to allow the user to define an area on the map 1205 as a geofence. Fewer or more options can be included or instead of the user-selectable options 1220 illustrated in FIG. 12. Additionally, while the illustrated implementation shows the menu 1210 displayed on top of the map 1205, the menu 1210 can be displayed adjacent to the map 1205 or in a menu bar displayed on a border of the map 1205.

Figure 13:
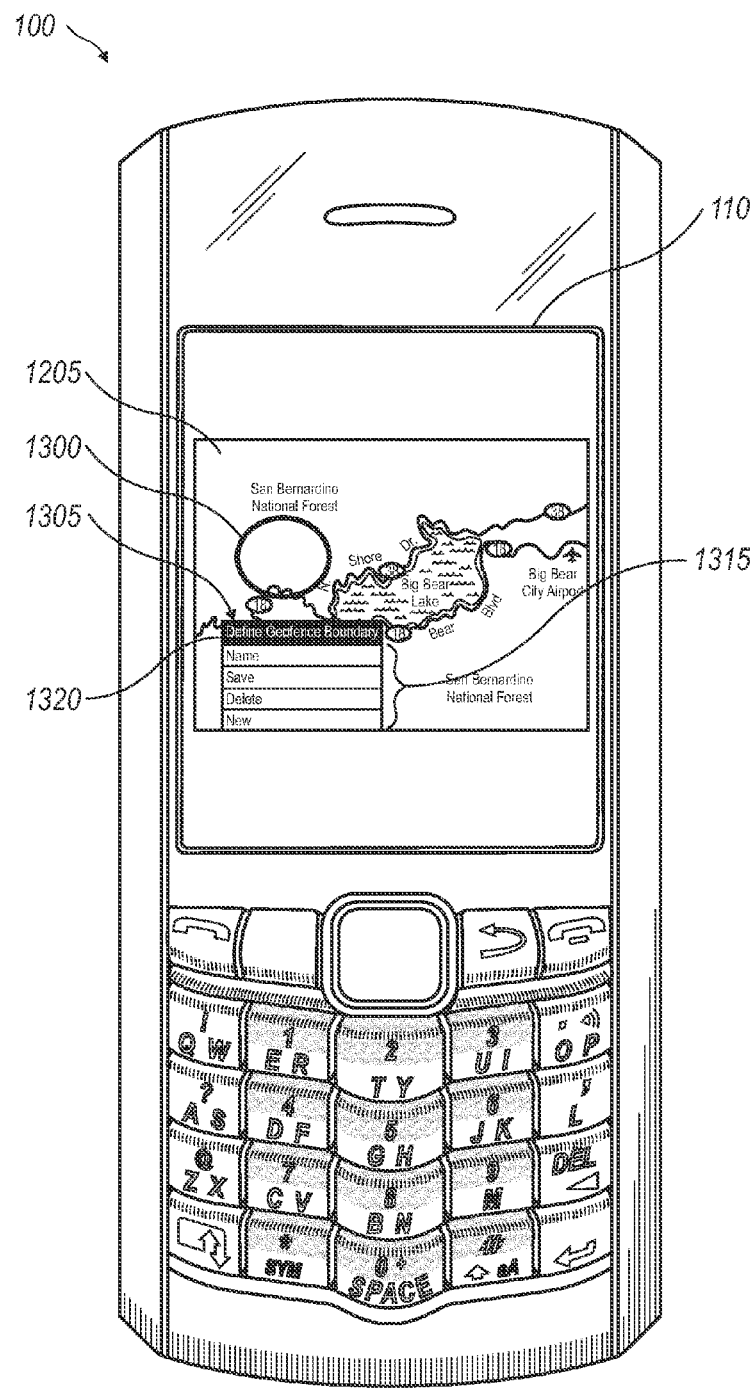
FIG. 13 is an illustration of a mobile device configured for automatic file naming in accordance with an exemplary implementation of the present technology, where a map having a geofence is displayed on the display screen of the mobile device.

FIG. 13 is an illustration of a subsequent user interface displayed on the display 110 of a mobile device 100 after the "Mark a Geofence" option 1225 highlighted in FIG. 12 has been selected. In FIG. 13, the user can draw or mark a geofence 1300 on the map 1205. The geofence 1300 can be the area encompassed by a shape drawn or marked on the map 1205 by the user. While the geofence in FIG. 13 is a circle, other shapes of geofences can be implemented. A second menu 1305 of user selectable options 1315 relating to defining geofences can be displayed on top of the map 1205 and proximate to the drawn geofence 1300. In FIG. 13, the user selectable options 1315 can include an option 1320 to define the boundaries of the geofence (for example an option labeled "Define Geofence Boundary"), a Name option to apply a label to the geofence already marked on the map 1205, a Save option to save the geofence marked on the map, a Delete option to delete the geofence marked on the map, and a New option to draw or mark a new geofence. In FIG. 13, the option 1320 to define the boundaries of the geofence has been highlighted and selected. In response to the selection of the highlighted option 1320, a pop-up window 1400 can be displayed on the map 1205 to replace of the menu 1305, as illustrated in FIG. 14.

Figure 14:
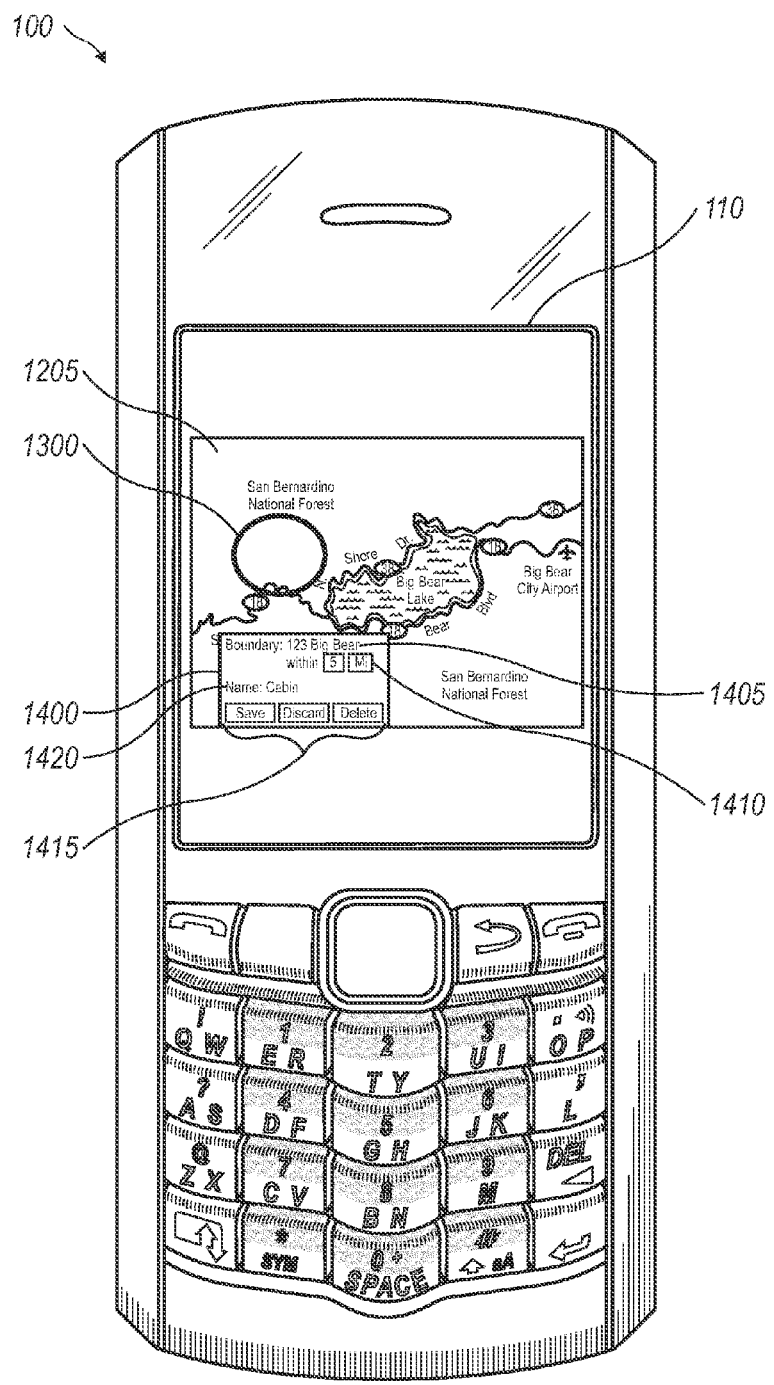
FIG. 14 is an illustration of a map application including a dialogue box for defining a geofence boundary displayed on a mobile device configured for automatic file naming in accordance with an exemplary implementation of the present technology.

In FIG. 14, the pop-up window 1400 can be displayed on top of the map 1205 proximate to the drawn geofence 1300. In at least one implementation, the pop-up window 1400 can include a plurality of options 1415 which can allow the user to define the boundaries and other parameters or information relating to the drawn geofence 1300. For example, the plurality of options 1415 can include a Save option for saving the defined boundaries, a Discard option for discarding the defined boundaries and information, and a Delete option for deleting the geofence. In the illustrated implementation, the pop-up window 1400 can also include the address 1405 associated with the geofence 1300, user-definable boundaries 1410 for defining the boundary of the geofence 1300, and a name field for assigning a label to the geofence 1300.

In FIG. 14, the pop-up window 1400 can allow for defining the boundaries 1410 of the geofence 1400 using radial boundaries. For example, the processor 300 can determine that the address 1405 encompassed by the geofence 1300 on the map is 123 Big Bear. The pop-up window 1400 can provide the user with the option to define the size of the geofence 1300 based on a radial boundary defined with respect to the address 1405. In FIG. 14, the user-definable boundary 1410 is within a radius of five miles from the address 1405. In other implementations, the user-definable boundary 1410 can be a radius with respect to the name of a locale, a geographical coordinate, or a longitudinal and latitudinal coordinate, rather than an address as illustrated in FIG. 14. In another implementation, the user-definable boundary 1410 can be a set of geographical coordinates. For example, the geofence 1300 can be a rectangular geofence, and the user-definable boundaries 1410 can be the longitudinal coordinates and the latitudinal coordinates of the corners of the rectangular geofence. However, other systems and methods of the geographical boundaries of a geofence 1300 can be implemented.

Also illustrated in FIG. 14, the pop-up window 1400 can provide a user-definable name field allowing the user to apply a label to the geofence 1300 marked on the map 1205. In FIG. 14, the label 1420 of the geofence is Cabin. The label 1420 identified in the name field can be added to a filename generated by a processor 300 in the event the current geographical location data matches the geofence 1300 or is encompassed by the geofence 1300. Other examples of labels 1420 can include: Home, School, Friend's House, Work, Parent's House, Park, or any other label. By applying a label 1420 to the geofence 1300, camera data captured within the geofence 1300 can have the label 1420 included in the filename generated by the processor 300 of the mobile device 100, thereby providing the user with a useful filename that can indicate the content and the location of the camera data to facilitate and enhance organizing and identifying the camera data from other files stored on a memory coupled to the mobile device 100. While the illustrated implementation in FIG. 14 illustrates user-definable boundaries defined by the user, labels, and other parameters related to the geofence 1300, one of ordinary skill in the art will appreciate that the boundaries, labels, and parameters can be defined by the manufacturer of the device 100, the developer of the map application, the service provider of the mobile device 100, or any other person or entity. Also, while the implementation of marking a geofence 1300 illustrated in FIGS. 12-14 is directed to defining the geofence 1300 in a map application, one of ordinary skill in the art will appreciate that the geofence 1300 can be marked in any other application, such as an address book or contact list application, an internet browser application, a camera application, or any other application that allows for the option to define geofences.

Figure 15:
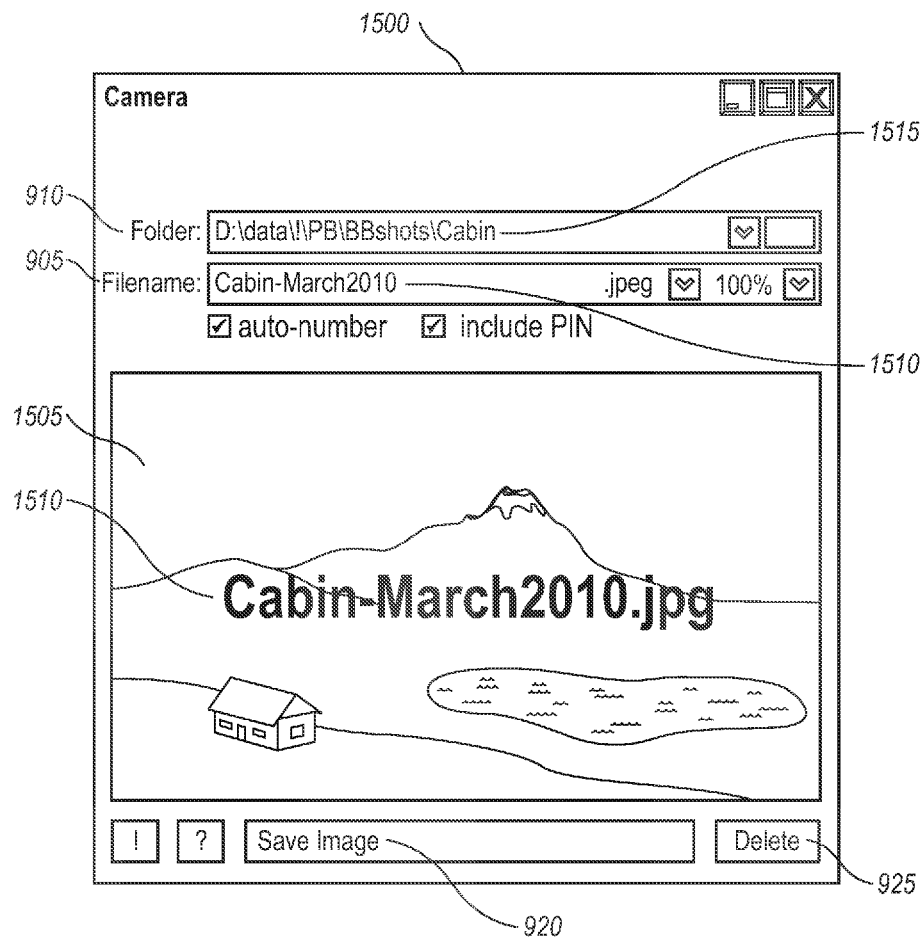
FIG. 15 is a screenshot of a camera application programmed on a mobile device configured for automatic file naming in accordance with an exemplary implementation of the present technology, where the automatic filename is generated based on the geofence illustrated in FIGS. 13 and 14.

FIG. 15 is an illustration of a filename generated when the current geographical data matches a geofence stored in the GL database 330 (shown in FIG. 3). Specifically, FIG. 15 is an illustration of a filename generated when the current geographical data matches the geofence 1300 marked in FIGS. 12-14. FIG. 15 is an illustration of a user interface 1500 for a camera application programmed on the mobile device 100. The user interface 1500 illustrated in FIG. 15 is similar to the user interfaces 900, 1000 illustrated in FIGS. 9 and 10 in that the user interface 1500 includes a Folder name field 910, a Filename field 905, a preview of the camera data 1505 captured, a Save Image 920 option for confirming saving the camera data 1505, and a Delete 925 option to delete the camera data 1505. Additionally, FIG. 15 is similar to FIGS. 9 and 10 in that the generated filename 1510 can be, but does not necessarily need to be, overlaid over the preview of the camera data 1505.

FIG. 15 differs from FIGS. 9 and 10 in that the filename 1510 is generated based on a match between the current geographical location data and a geofence stored in the GL database 330. In at least one implementation, the current geographical location data of the mobile device 100 is located within the boundaries 1410 (illustrated in FIG. 14) of the geofence 1300 (illustrated in FIGS. 12-14). For example, the processor 300 can determine that as the current geographical location data matches the address 1420 used as a reference point in defining the boundaries of the geofence 1300 or is located within the boundaries of the geofence 1300, the content of the camera data 1515 is related to the geofence 1300 having the label 1420, Cabin. Accordingly, the processor 300 can automatically generate a filename 1510 comprising the label 1420 of the geofence 1300. Similar to the user interface illustrated in FIG. 10, the filename 1510 illustrated in FIG. 15 can include the current date the camera data was captured.

Also similar to FIGS. 9 and 10, the processor 300 of the implementation in FIG. 15 can create or select a folder in which to save the camera data 1505. In FIG. 15, the processor 300 has searched and selected a folder named Cabin, as the folder name 1515 comprises at least a portion of the generated filename 1110. While FIG. 15 illustrates the selection of an already-existing folder stored on the memory coupled to the mobile device, in at least one implementation, the processor 300 can create a new folder comprising at least a portion of the generated filename 1510.

While the implementation illustrated in FIG. 12-15 illustrates a geofence 1300 that is independent of information contained in the PIM database. One of ordinary skill in the art will appreciate that geofences 1300 can be marked in the list of contacts. A contact 1000 can include a geofence indicating a bounded geographical area associated with the contact 1000. For example, with the contact 1000 illustrated in FIG. 10, instead of the address 1015 labeled as the work address a geofence can be marked to identify a boundary surrounding the address 1015 and can have a label assigned thereto named Work.

In FIG. 15, as the generated filename 1510 comprises the label 1420 of a geofence 1300 saved in the GL database 330

(shown in FIG. 3) of the mobile device 100, information relating to the content of the associated camera data 1505 can be readily presented to the user. For example, the filename 1510 can indicate that the camera data 1505 is a photograph or video taken at or within the vicinity of the Cabin or can indicate any other association between the geofence 1300 and the content of the camera data 1505.

While the system and method of automatic file naming on a mobile device have been described in relation to the exemplary implementations illustrated in FIGS. 1-15, one of ordinary skill in the art will appreciate that the limitations and elements illustrated and described herein can be optionally included or combined with one another to achieve the technical advantages of the claimed subject matter as described herein.

Figure 16:
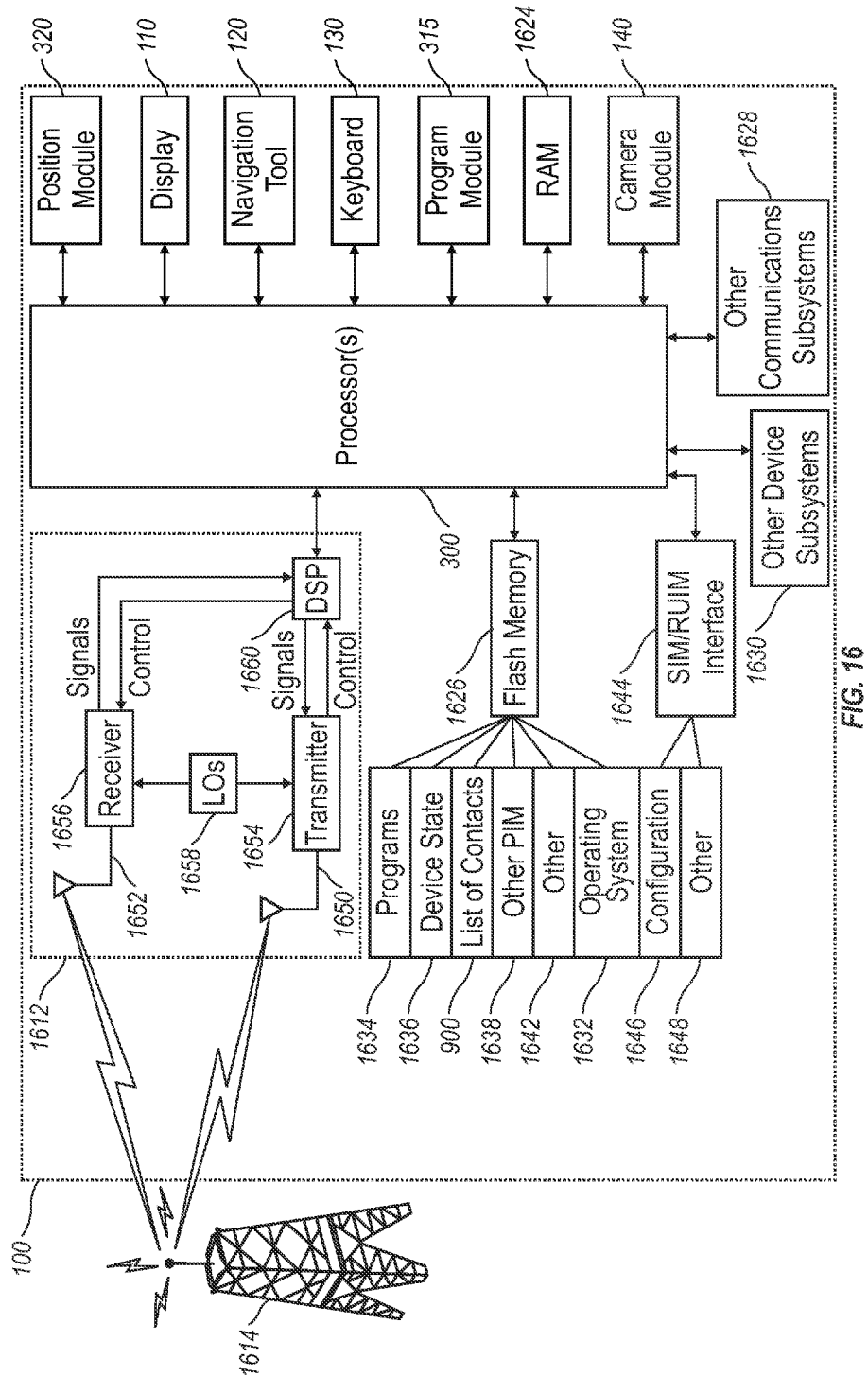
FIG. 16 is a block diagram representing a mobile device configured for automatic file naming interacting in a communication network in accordance with an exemplary implementation of the present technology.

An exemplary implementation of a mobile device 100 configured to automatically name files can include components as illustrated in FIG. 16. While the components of FIG. 16 are not all inclusive, FIG. 16 illustrates components that can be included on a mobile device 100 according to the present disclosure. Additional components are required to allow the mobile device 100 to function but have been omitted for clarity.

As illustrated in FIG. 16, the mobile device 100 includes a communication subsystem 1630 to perform all communication transmission and reception with a wireless network 1614. A processor module 300 can be connected with an auxiliary input/output (I/O) subsystem 1628 which can be coupled to the mobile device 100. The processor module 300 can include one or more processors. Additionally, the processors can be micro-processors for example. In at least one implementation, the processor module 300 can be coupled to a serial port (for example, a Universal Serial Bus port) which can allow for communication with other devices or systems. The display 110 can be coupled to the processor module 300 to allow for displaying of information to a user of the mobile device 100. When the mobile device 100 is equipped with a keyboard 130, the keyboard 130 can also be connected with the processor module 300. The mobile device 100 can include a speaker, a microphone, random access memory (RAM) 1624, and flash memory 1626, all of which can be coupled to the processor module 300. Other similar components can be provided on the mobile device 100 as well and optionally coupled to the processor module 300. Other communication subsystems 1630 and other communication device subsystems 1628 are generally indicated as being functionally connected with the processor module 300 as well. An example of the communication subsystem 1612 is that of a short range communication system such as BLUETOOTH® communication module or a WI-FI® communication module (a communication module in compliance with IEEE 802.11 set of protocols) and associated circuits and components. The processor module 300 is able to perform operating system functions and enables execution of programs on the mobile device 100. In some implementations not all of the above components can be included in the mobile device 100.

The auxiliary I/O subsystem 1660 can take the form of a trackpad navigation tool, or a trackball, a thumbwheel, a navigation pad, a joystick, touch-sensitive interface, or other I/O interface. While the above examples have been provided in relation to the auxiliary I/O subsystem 1660, other subsystems capable of providing input or receiving output from the mobile device 100 are considered within the scope of this disclosure. Other keys can be placed along the side of the mobile device 100 to function as escape keys, volume control keys, scrolling keys, power switches, or user programmable keys, and can likewise be programmed accordingly.

Furthermore, the mobile device 100 is equipped with components to enable operation of various programs, as shown in FIG. 16. For example, such a program can be a computer application programmed to automatically generate a filename based on at least one of the current date, the current time, and the current location of the mobile device 100. In an exemplary implementation, the flash memory 1626 is enabled to provide a storage location for the operating system 1632, device programs 1634, and data. The operating system 1632 is generally configured to manage other programs 1642 that are also stored in memory 1626 and executable on the processor 300. The operating system 1632 honors requests for services made by programs 1634 through predefined program 1634 interfaces. More specifically, the operating system 1626 typically determines the order in which multiple programs 1634 are executed on the processor 300 and the execution time allotted for each program 1634, manages the sharing of memory 1626 among multiple programs 1634, handles input and output to and from other device subsystems 1630, and so on. In addition, users can typically interact directly with the operating system 1632 through a user interface which can include the keyboard 130 and display screen 110. While in an exemplary implementation the operating system 1632 is stored in flash memory 1626, the operating system 1632 in other implementations is stored in read-only memory (ROM) or similar storage element (not shown). As those skilled in the art will appreciate, the operating system 1632, device program 1634 or parts thereof can be loaded in RAM 1624 or other volatile memory.

In one exemplary implementation, the flash memory 1626 contains programs 1634 for execution on the mobile device 100 including an address book 936, a personal information manager (PIM) 1638, and the device state 1640. Furthermore, programs 1634 and other information 1648 including data can be segregated upon storage in the flash memory 1626 of the mobile device 100.

When the mobile device 100 is enabled for two-way communication within the wireless communication network 1614, the mobile device 100 can send and receive messages from a mobile communication service. Examples of communication systems enabled for two-way communication include, but are not limited to, the General Packet Radio Service (GPRS) network, the Universal Mobile Telecommunication Service (UMTS) network, the Enhanced Data for Global Evolution (EDGE) network, the Code Division Multiple Access (CDMA) network, High-Speed Packet Access (HSPA) networks, Universal Mobile Telecommunication Service Time Division Duplexing (UMTS-TDD), Ultra Mobile Broadband (UMB) networks, Worldwide Interoperability for Microwave Access (WiMAX), and other networks that can be used for data and voice, or just data or voice. For the systems listed above, the communication device 100 can require a unique identifier to enable the communication device 100 to transmit and receive messages from the communication network 1614. Other systems may not require such identifying information. GPRS, UMTS, and EDGE use a Subscriber Identity Module (SIM) in order to allow communication with the communication network 1614. Likewise, most CDMA systems use a Removable User Identity Module (RUIM) in order to communicate with the CDMA network. The RUIM and SIM card can be used in multiple different mobile devices 100. The mobile device 100 can be able to operate some features without a SIM/RUIM card, but the mobile device will not be able to communicate with the network 1614. A SIM/RUIM interface 1644 located within the mobile device 100 allows for removal or insertion of a SIM/RUIM card (not shown). The SIM/RUIM card features memory and holds key configurations 1646, and other information 1648 such as identification and subscriber related information. With a properly enabled mobile device 100, two-way communication between the mobile device 100 and communication network 1614 is possible.

If the mobile device 100 is enabled as described above or the communication network 1614 does not require such enablement, the two-way communication enabled mobile device 100 is able to both transmit and receive information from the communication network 1614. The transfer of communication can be from the mobile device 100 or to the mobile device 100. In order to communicate with the communication network 1614, the mobile device 100 in the presently described exemplary implementation is equipped with an integral or internal antenna 1650 for transmitting messages to the communication network 1614. Likewise the mobile device 100 in the presently described exemplary implementation is equipped with another antenna 1652 for receiving communication from the communication network 1614. These antennae (1652, 1650 in another exemplary implementation are combined into a single antenna (not shown). As one skilled in the art would appreciate, the antenna or antennae (1652, 1650) in another implementation are externally mounted on the mobile device 100.

When equipped for two-way communication, the mobile device 100 features the communication subsystem 1612. As is understood in the art, the communication subsystem 1612 is modified so that the subsystem 912 can support the operational needs of the mobile device 100. The subsystem 1612 includes a transmitter 1654 and receiver 1656 including the associated antenna or antennae (1652, 1650) as described above, local oscillators (LOs) 1658, and a processing module which in the presently described exemplary implementation is a digital signal processor (DSP) 1660.

The present disclosure contemplates that communication by the mobile device 100 with the wireless network 1614 can be any type of communication that both the wireless network 1614 and mobile device 100 are enabled to transmit, receive and process. In general, these can be classified as voice and data. Voice communication generally refers to communication in which messages for audible sounds are transmitted by the mobile device 100 through the communication network 1614. Data generally refers to all other types of communication that the mobile device 100 is capable of performing within the constraints of the wireless network 1614.

Example device programs that can depend on such data include email, contacts and calendars. For each such program, synchronization with home-based versions of the programs can be desirable for either or both of the program's long term and short term utility. As an example, emails are often time sensitive, so substantially real time synchronization can be desired. Contacts, on the other hand, can be usually updated less frequently without inconvenience. Therefore, the utility of the mobile device 100 is enhanced when connectable within a communication system, and when connectable on a wireless basis in the network 1614 in which voice, text messaging, and other data transfer are accommodated.

Even more, the present technology can take the form of hardware, or both hardware and software elements. In some implementations, the technology is implemented in software, which includes but is not limited to firmware, resident software, microcode, a Field Programmable Gate Array (FPGA) or Application-Specific Integrated Circuit (ASIC), etc. In particular, for real-time or near real-time use, an FPGA or ASIC implementation is desirable.

Those of skill in the art will appreciate that other implementations of the disclosure may be practiced in network computing environments with many types of computer system configurations, including personal computers, hand-held devices, multi-processor systems, microprocessor-based or programmable consumer electronics, network PCs, minicomputers, mainframe computers, and the like. Implementations may also be practiced in distributed computing environments where tasks are performed by local and remote processing devices that are linked (either by hardwired links, wireless links, or by a combination thereof) through a communications network. In a distributed computing environment, program modules may be located in both local and remote memory storage devices.

Furthermore, the present technology can take the form of a computer program product comprising program modules accessible from computer-usable or computer-readable medium storing program code for use by or in connection with one or more computers, processors, or instruction execution system. For the purposes of this description, a computer-usable or computer readable medium can be any apparatus that can contain, store, communicate, propagate, or transport the program for use by or in connection with the instruction execution system, apparatus, or device. The medium can be an electronic, magnetic, optical, electromagnetic, infrared, or semiconductor system (or apparatus or device) or a propagation medium (though propagation mediums as signal carriers per se are not included in the definition of physical computer-readable medium). Examples of a physical computer-readable medium include a semiconductor or solid state memory, removable memory connected via USB, magnetic tape, a removable computer diskette, a random access memory (RAM), a read-only memory (ROM), a rigid magnetic disk, an optical disk, and non-transitory memory. Current examples of optical disks include compact disk-read only memory (CD-ROM), compact disk-read/write (CD-R/W), DVD, and Blu Ray™.

Implementations within the scope of the present disclosure may also include tangible and/or non-transitory computer-readable storage media for carrying or having computer-executable instructions or data structures stored thereon. Additionally, non-transitory memory also can store programs, device state, various user information, one or more operating systems, device configuration data, and other data that may need to be accessed persistently. Further, non-transitory computer-readable storage media expressly exclude media such as energy, carrier signals, electromagnetic waves, and signals per se. Such non-transitory computer-readable storage media can be any available media that can be accessed by a general purpose or special purpose computer, including the functional design of any special purpose processor as discussed above. When information is transferred or provided over a network or another communications connection (either hardwired, wireless, or combination thereof) to a computer, the computer properly views the connection as a computer-readable medium. Thus, any such connection is properly termed a computer-readable medium. Combinations of the above should also be included within the scope of the computer-readable media. Both processors and program code for implementing each medium as an aspect of the technology can be centralized or distributed (or a combination thereof) as known to those skilled in the art.

Computer-executable instructions include, for example, instructions and data which cause a general purpose computer, special purpose computer, or special purpose processing device to perform a certain function or group of functions. Computer-executable instructions also include program modules that are executed by computers in stand-alone or network environments. Generally, program modules include routines, programs, components, data structures, objects, and the functions inherent in the design of special-purpose processors, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

A data processing system suitable for storing a computer program product of the present technology and for executing the program code of the computer program product will include at least one processor coupled directly or indirectly to memory elements through a system bus. The memory elements can include local memory employed during actual execution of the program code, bulk storage, and cache memories that provide temporary storage of at least some program code in order to reduce the number of times code must be retrieved from bulk storage during execution. Input/output or I/O devices (including but not limited to keyboards, displays, pointing devices, etc.) can be coupled to the system either directly or through intervening I/O controllers. Network adapters can also be coupled to the system to enable the data processing system to become coupled to other data processing systems or remote printers or storage devices through intervening private or public networks. Modems, cable modem, Wi-Fi, and Ethernet cards are just a few of the currently available types of network adapters. Such systems can be centralized or distributed, e.g., in peer-to-peer and client/server configurations. In some implementations, the data processing system is implemented using one or both of FPGAs and ASICs.

While the implementations of the system and method of automatic file naming has been described and illustrated as including a GL database and a PIM database stored on the mobile device, one of ordinary skill in the art will appreciate that the GL database and the PIM database can be stored on a removable media or a remote media communicatively coupled to the mobile device. Also, while the illustrated implementations are described as being executed by a processor stored on the mobile device, one of ordinary skill in the art will appreciate that the processor can also be remote from the mobile device but communicatively coupled to the mobile device. Additionally, while the system and method of automatic file naming has been described as being user-definable, one of ordinary skill in the art will appreciate that some or all of the instructions and parameters for automatically-generated filenames based on the current geographical location data, the current time data, and current date data can be defined by a third party, such as a service provider, the mobile device manufacturer, an software application developer, or any person or entity other than the user of the mobile device.

Exemplary implementations have been described hereinabove regarding a system and method for automatic file naming on a mobile device. With the system and method for automatic file naming of files stored and captured by the mobile device, information relating to the content and conditions (for example, the current geographical location, the current time, and current date) at which the file or camera data was captured is readily available without having to rename the file. Additionally, the present disclosure enables quick review and identification of the content of a file or camera data when retrieving files or organizing files on the mobile device. Additionally, the automatically-generated filename allows a user to receive limited relevant information pertinent to the content of the file or the camera data, thereby providing for a more enhanced file management system on the mobile device. As the filenames of files and camera data captured on a mobile device are automatically-generated to include information relevant to the content of and conditions at which the file or camera data was captured, the intuitiveness, user-friendliness, efficiency, and ease of organizing and identifying files stored on a memory coupled to the mobile device is enhanced.

One of ordinary skill in the art will appreciate that the features in each of the figures described herein can be combined with one another and arranged to achieve the described benefits of the presently disclosed system and method for determining action spots relative to the location of a mobile device. Additionally, one of ordinary skill will appreciate that the elements and features from the illustrated implementations herein can be optionally included to achieve the described benefits of the presently disclosed system and method for determining action spots relative to the location of a mobile device. Various modifications to and departures from the disclosed implementations will occur to those having skill in the art.

The invention claimed is:

1. An electronic device comprising:
 a processor;
 a camera module communicatively coupled to the processor;
 at least one computer readable medium communicatively coupled to the processor; and
 at least one program module stored on the at least one computer readable medium, said at least one program module operable, upon execution by the processor to:
  determine at least one of a current geographical location data, a current time data, and a current date data;
  compare the at least one of the current geographical location data, the current time data, and the current date data to at least one of a personal information manager database and a geographical location database, wherein the personal information manager database comprises at least one of a calendar and a list of contacts, wherein each contact includes a name and at least one of a phone number and a physical address;
  determine the contact associated with the current geographical location based on at least one of the physical address and the phone number of the contact in the list of contacts;
  generate a filename, based on the comparison of the at least one of the current geographical location data, the current time data, and the current date data with the at least one of the personal information manager database and the geographical location database and based on a naming hierarchy, and adding a name of the contact associated with the current geographical location data to the filename;
  receive camera data from the camera module; and
  automatically apply the filename to the camera data by saving the camera data with the generated filename in response to receiving the camera data.

2. The electronic device of claim 1, wherein said at least one program module is further operable, upon execution by the processor, to:
 determine an entry on the calendar associated with at least two of the current geographical location data, the current time data, and the current date data;

wherein generating the filename comprises adding a title of the entry associated with at least two of the current geographical location data, the current time data, and the current date data.

3. The electronic device of claim 1, wherein the entry on the calendar comprises an entry title, a date, a time, a duration, and a location, and said at least one program module is further operable, upon execution by the processor, to:
  compare the current geographical location data, the current time data, and the current data to the date, the time, the duration, and the location of the entry;
  verify attendance of the entry in the event the current geographical location data and at least one of the current date data and the current time data match the location, the date, the time, and the duration of the entry;
  wherein generating the filename comprises adding the entry title in the event attendance of the entry is verified.

4. The electronic device of claim 1, wherein
  the geographical location database comprises at least one geofence comprising a predefined boundary identifying a geographical area and a corresponding label; and
  generating the filename comprises adding the corresponding label.

5. The electronic device of claim 1, wherein the at least one program module is further operable, upon execution by the processor, to:
  create a folder having a name comprising at least a portion of the filename; and
  save the camera data to the folder.

6. The electronic device of claim 1, wherein the naming hierarchy comprises at least a set of rules indicating an order of naming elements to generate the filename.

7. A method for naming camera data captured by a camera module of a mobile device, said method comprising:
  comparing at least one of a current geographical location data, a current time data, and a current date data to at least one of a personal information manager database and a global location database, wherein the personal information manager database comprises at least one of a calendar of entries and a list of contacts, wherein each contact includes a name and at least one of a phone number and a physical address;
  determine the contact associated with the current geographical location based on at least one of the physical address and the phone number of the contact in the list of contacts;
  generating a filename, based on the comparison of the at least one of the current geographical location data, the current time data, and the current date data with the at least one of the personal information manager database and the geographical location database and based on a naming hierarchy, and adding a name of the contact associated with the current geographical location data to the filename; and
  automatically applying the generated filename by saving the camera data with the generated filename to one of the at least one computer readable medium coupled to the mobile device, in response to receiving camera data from the camera module.

8. The method of claim 7, wherein the entry on the calendar comprises an entry title, a date, a time, a duration, and a location, and said method further comprises:
  comparing the current geographical location data, the current time data, and the current data to the date, the time, the duration, and the location of the entry;
  verifying attendance of the entry in the event the current geographical location data and at least one of the current date data and the current time data match the location, the date, the time, and the duration of the entry;
  wherein generating the filename comprises adding the entry title in the event attendance of the entry is verified.

9. The method of claim 7, wherein
  the geographical location database comprises at least one geofence comprising a predefined boundary identifying a geographical area and a corresponding label; and
  generating the filename comprises adding the corresponding label.

10. The method of claim 7, wherein the naming hierarchy comprises at least a set of rules indicating an order of naming elements to generate the filename.

11. A non-transitory computer readable medium storing computer executable instructions for a method comprising:
  capturing camera data from a camera module;
  determining at least one of a current geographical location data, a current time data, and a current date data in response to receiving camera data from the camera module;
  comparing the at least one of the current geographical location data, the current time data, and the current date data to at least one of a personal information manager database and a geographical location database, wherein the personal information manager database comprises at least one of a calendar of entries and a list of contacts, wherein each contact includes a name and at least one of a phone number and a physical address;
  generating a filename, based on the comparison of the at least one of the current geographical location data, the current time data, and the current date data with the at least one of the personal information manager database and the geographical location database and based on a naming hierarchy, and adding a name of the contact associated with the current geographical location data to the filename; and
  automatically applying the filename to the camera data by saving the camera data with the generated filename in response to receiving the camera data.

12. The non-transitory computer readable medium of claim 11, wherein the entry on the calendar comprises an entry title, a date, a time, a duration, and a location, and said method further comprises:
  comparing the current geographical location data, the current time data, and the current data to the date, the time, the duration, and the location of the entry;
  verifying attendance of the entry in the event the current geographical location data and at least one of the current date data and the current time data match the location, the date, the time, and the duration of the entry;
  wherein generating the filename comprises adding the entry title in the event attendance of the entry is verified.

13. The non-transitory computer readable medium of claim 11, wherein
  the geographical location database comprises at least one geofence comprising a predefined boundary identifying a geographical area and a corresponding label; and
  generating the filename comprises adding the corresponding label.

14. The non-transitory computer readable medium of claim 11, further comprising a set of instructions indicating an order of naming elements to generate the filename.

* * * * *